US012776482B2

(12) United States Patent
Simmons et al.

(10) Patent No.: US 12,776,482 B2
(45) Date of Patent: Oct. 27, 2026

(54) GAIN CALIBRATION FOR QUANTITATION USING ON-DEMAND/DYNAMIC IMPLEMENTATION OF MS SENSITIVITY IMPROVEMENT TECHNIQUES

(71) Applicant: DH TECHNOLOGIES DEVELOPMENT PTE. LTD., Singapore (SG)

(72) Inventors: Douglas Arnold Simmons, Whitby (CA); Wen Jin, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 281 days.

(21) Appl. No.: 18/559,758

(22) PCT Filed: May 3, 2022

(86) PCT No.: PCT/IB2022/054079

§ 371 (c)(1),
(2) Date: Nov. 8, 2023

(87) PCT Pub. No.: WO2022/243775

PCT Pub. Date: Nov. 24, 2022

(65) Prior Publication Data

US 2024/0249929 A1 Jul. 25, 2024

Related U.S. Application Data

(60) Provisional application No. 63/189,330, filed on May 17, 2021.

(51) Int. Cl.

| | |
|---|---|
| ***H01J 49/00*** | (2006.01) |
| ***H01J 49/06*** | (2006.01) |
| ***H01J 49/40*** | (2006.01) |

(52) U.S. Cl.
CPC ........ *H01J 49/0009* (2013.01); *H01J 49/062* (2013.01); *H01J 49/40* (2013.01)

(58) Field of Classification Search
CPC ....... H01J 49/0009; H01J 49/062; H01J 49/40
See application file for complete search history.

(56) References Cited

U.S. PATENT DOCUMENTS 6,777,671 B2 * 8/2004 Doroshenko ......... H01J 49/004 250/281
7,456,388 B2 * 11/2008 Loboda ................. H01J 49/062 250/396 R (Continued)

FOREIGN PATENT DOCUMENTS

WO WO-2019198010 A1 * 10/2019 .......... H01J 49/0022

OTHER PUBLICATIONS

International Search Report and Written Opinion for PCT/IB2022/054079, mailed Jul. 27, 2022.

(Continued)

*Primary Examiner* — Wyatt A Stoffa
*Assistant Examiner* — Larry Li
(74) *Attorney, Agent, or Firm* — Merchant & Gould P.C.

(57) ABSTRACT

Ions fragmented from a known precursor ion of a known compound are received by an ion guide that ejects the ions into an extraction region of a TOF mass analyzer. The ion guide ejects the ions using Zeno pulsing mode and the TOF mass analyzer measures intensities of the ions over time, producing a Zeno group of mass spectra. The ion guide then switches to a normal pulsing mode, producing a normal group of mass spectra. A gain is calculated for Zeno mode in comparison to normal mode as a series of ratios of intensities of one or more ions obtained from the Zeno group to corresponding intensities of the one or more ions obtained from the normal group. The gain is used to calculate a (Continued)

percentage of the theoretical gain and is used along with the theoretical gain to quantitate a compound in an on-demand Zeno pulsing quantitation experiment.

14 Claims, 13 Drawing Sheets

(56) References Cited

U.S. PATENT DOCUMENTS

| | | | | |
|---|---|---|---|---|
| 9,673,031 | B2 * | 6/2017 | Bateman | H01J 49/0036 |
| 2003/0218129 | A1 * | 11/2003 | Rather | H01J 49/40 250/282 |
| 2004/0024545 | A1 * | 2/2004 | Tian | H02H 5/105 702/60 |
| 2009/0108191 | A1 * | 4/2009 | Yefchak | H01J 49/025 250/252.1 |
| 2010/0301205 | A1 * | 12/2010 | Thomson | H01J 49/0045 250/283 |
| 2011/0049355 | A1 * | 3/2011 | Fuhrer | H01J 49/0036 250/282 |
| 2011/0186727 | A1 * | 8/2011 | Loboda | H01J 49/40 250/282 |
| 2012/0032072 | A1 * | 2/2012 | Quarmby | H01J 49/025 250/281 |
| 2014/0131567 | A1 * | 5/2014 | Makarov | H01J 49/004 250/288 |
| 2016/0209361 | A1 * | 7/2016 | Bloomfield | H01J 49/40 |
| 2016/0217995 | A1 * | 7/2016 | Hayashi | H01J 43/20 |
| 2017/0219525 | A1 * | 8/2017 | Blagojevic | G01N 27/624 |
| 2017/0221692 | A1 * | 8/2017 | Baba | H01J 49/403 |
| 2018/0025898 | A1 * | 1/2018 | Grothe, Jr. | H01J 49/22 250/282 |
| 2021/0366701 | A1 * | 11/2021 | Bloomfield | H01J 49/025 |

OTHER PUBLICATIONS

Loboda et al., "A Novel Ion Trap That Enables High Duty Cycle and Wide m/z Range on an Orthogonal Injection TOF Mass Spectrometer", the Journal of the American Society of Mass Spectrometry, Jul. 2009, vol. 20, No. 7, pp. 1342-1348.
PCT International Preliminary Report on Patentability in International Application PCT/IB2022/054079, mailed Nov. 30, 2023, 10 pages.

* cited by examiner $$\%\ \text{OF THEORETICAL GAIN} = \frac{\text{GAINactual}(m/z)}{Gain = C\sqrt{\frac{(m/z)_{max}}{(m/z)}}} \times 100\%$$

GAIN CALIBRATION FOR QUANTITATION USING ON-DEMAND/DYNAMIC IMPLEMENTATION OF MS SENSITIVITY IMPROVEMENT TECHNIQUES

RELATED APPLICATIONS

This application is a National Stage Application of PCT/IB2022/054079, filed May 3, 2022, which claims the benefit of U.S. Provisional Patent Application No. 63/189,330, filed May 17, 2021, the entire disclosures of which are incorporated herein by reference in their entireties. To the extent appropriate, a claim of priority is made to each of the above disclosed applications.

INTRODUCTION

The teachings herein relate to calibrating the gain of the Zeno pulsing mode of a tandem mass spectrometer. More specifically, systems and methods are provided to measure the intensities of one or more product ions of a known compound over time while switching back and forth between Zeno pulsing mode and normal pulsing mode. The gain is calculated as the ratio of the intensities measured with Zeno pulsing to the intensities measured with normal pulsing mode.

The systems and methods herein can be performed in conjunction with a processor, controller, or computer system, such as the computer system of FIG. 1.

Problem of Variable On-Demand Zeno Pulsing Gain Among Instruments

As described below, Zeno pulsing refers to a method of operating a specially configured ion guide to concentrate ions for mass analysis. More specifically, in Zeno pulsing, all ions ejected from an ion guide (regardless of m/z) are made to arrive at a designated point in space, such as an extraction region or accelerator of a TOF mass analyzer, in a desired sequence or at a desired time and with roughly the same energy.

This method of concentrating ions can produce sensitivity gains (e.g., 3 times for mass 2000 Da and 14 times for mass 100 Da) over a wide m/z range without a loss of mass accuracy or resolution. In other words, Zeno pulsing can increase the intensities of ions.

One problem with Zeno pulsing, however, is that the large increase in sensitivity can result in saturation at the detector of the tandem mass spectrometer. Essentially, the intensity of already intense ions can be increased to a point at which these ions saturate the detector. This, in turn, reduces the dynamic range of these ions.

As described below, one solution to this problem is a method of dynamically turning on and off Zeno pulsing. This is referred to as on-demand Zeno pulsing or Zeno on-demand (ZOD). In on-demand Zeno pulsing, the large gain in sensitivity produced by Zeno pulsing is obtained and saturation is avoided by dynamically switching between Zeno pulsing mode and normal pulsing mode within the same experiment. In addition, the switching between pulsing modes is triggered by the intensity of the ion in the previous MSMS scan. In other words, if the intensity of the ion in the previous MSMS scan exceeds a certain threshold, Zeno pulsing mode is turned off and normal pulsing mode is turned on. Similarly, if the intensity of the ions in the previous MSMS scan is less than or equal to a certain threshold, normal pulsing mode is turned off and Zeno pulsing mode is turned back on.

For such on-demand Zeno pulsing acquisitions, it is necessary to scale down the intensities of Zeno pulsing mode data or scale up the intensities of normal pulsing mode data to provide one consistent set of data. Scaling is performed using the theoretical gain formula shown below.

Conventionally it was thought that the theoretical gain formula held for all instruments. In practice, however, it has been found that the actual gain of an instrument is rarely within five percent of the theoretical gain. As a result, it is not possible to scale the data accurately for quantitation using the theoretical gain alone.

Consequently, there is a need for additional systems and methods for scaling the data produced by on-demand Zeno pulsing to provide one consistent set of measured data.

Tandem Mass Spectrometry Background

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into fragment or product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

LC-MS and LC-MS/MS Background

The combination of mass spectrometry (MS) (or mass spectrometry/mass spectrometry (MS/MS)) and liquid chromatography (LC) is an important analytical tool for identification and quantification of compounds within a mixture. Generally, in liquid chromatography, a fluid sample under analysis is passed through a column filled with a solid adsorbent material (typically in the form of small solid particles, e.g., silica). Due to slightly different interactions of components of the mixture with the solid adsorbent material (typically referred to as the stationary phase), the different components can have different transit (elution) times through the packed column, resulting in separation of the various components. In LC-MS, the effluent exiting the LC column can be continuously subjected to mass spectrometric analysis to generate total ion chromatogram (TIC) and an extracted ion chromatogram (XIC) or LC peak, which can depict detected ion intensity (a measure of the total number of detected ions or of one or more particular analytes) as a function of elution or retention time.

In some cases, the LC effluents can be subjected to tandem mass spectrometry (or mass spectrometry/mass spectrometry MS/MS) for the identification of product ions corresponding to the peaks in the XIC. For example, the precursor ions can be selected based on their mass/charge ratio to be subjected to subsequent stages of mass analysis. The selected precursor ions can then be fragmented (e.g., via collision induced dissociation), and the fragmented ions (product ions) can be analyzed via a subsequent stage of mass spectrometry.

Tandem Mass Spectrometry Acquisition Methods

A large number of different types of experimental acquisition methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined or known for a compound of interest. As a sample is being introduced into the tandem mass spectrometer, the one or more transitions are interrogated during each time period or cycle of a plurality of time periods or cycles. In other words, the mass spectrometer selects and fragments the precursor ion of each transition and performs a targeted mass analysis for the product ion of the transition. As a result, an intensity (a product ion intensity) is produced for each transition. Targeted acquisition methods include, but are not limited to, multiple reaction monitoring (MRM) and selected reaction monitoring (SRM).

MRM experiments are typically performed using "low resolution" instruments that include, but are not limited to, triple quadrupole (QqQ) or quadrupole linear ion trap (QqLIT) devices. With the advent of "high resolution" instruments, there was a desire to collect MS and MS/MS using workflows that are similar to QqQ/QqLIT systems. High resolution instruments include, but are not limited to, quadrupole time-of-flight (QqTOF) or orbitrap devices. These high resolution instruments also provide new functionality.

MRM on QqQ/QqLIT systems is the standard mass spectrometric technique of choice for targeted quantification in all application areas, due to its ability to provide the highest specificity and sensitivity for the detection of specific components in complex mixtures. However, the speed and sensitivity of today's accurate mass systems have enabled a new quantification strategy with similar performance characteristics. In this strategy (termed MRM high resolution (MRM-HR) or parallel reaction monitoring (PRM)), looped MS/MS spectra are collected at high-resolution with short accumulation times, and then fragment ions (product ions) are extracted post-acquisition to generate MRM-like peaks for integration and quantification. With instrumentation like the TRIPLETOF® Systems of AB SCIEX™, this targeted technique is sensitive and fast enough to enable quantitative performance similar to higher end triple quadrupole instruments, with full fragmentation data measured at high resolution and high mass accuracy.

In other words, in methods such as MRM-HR, a high resolution precursor ion mass spectrum is obtained, one or more precursor ions are selected and fragmented, and a high resolution full product ion spectrum is obtained for each selected precursor ion. A full product ion spectrum is collected for each selected precursor ion but a product ion mass of interest can be specified and everything other than the mass window of the product ion mass of interest can be discarded.

In an IDA method, a user can specify criteria for performing an untargeted mass analysis of product ions, while a sample is being introduced into the tandem mass spectrometer. For example, in an IDA method, a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS can be repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

Ion Guide for Concentrating Ion Packets

U.S. Pat. No. 7,456,388 (hereinafter the "'388 Patent") issued on Nov. 25, 2008, and incorporated herein by reference, describes an ion guide for concentrating on packets. The '388 Patent provides apparatus and methods that allow, for example, analysis of ions over broad m/z ranges with virtually no transmission losses. The ejection of ions from an ion guide is affected by creating conditions where all ions (regardless of m/z) may be made to arrive at a designated point in space, such as for example an extraction region or accelerator of a TOF mass analyzer, in a desired sequence or at a desired time and with roughly the same energy. Ions bunched in such a way can then be manipulated as a group, as for example by being extracted using a TOF extraction pulse and propelled along a desired path in order to arrive at the same spot on a TOF detector.

To make heavier and lighter ions with the same energy meet at a point in space such as the extraction region of a mass analyzer at substantially the same time, heavier ions can be ejected from the ion guide before lighter ions. Heavier ions of a given charge travel more slowly in an electromagnetic field than lighter ions of the same charge, and therefore can be made to arrive at the extraction region or other point at the same time as, or at a selected interval with respect to, the lighter ions if released within a field in a desired sequence. The '388 Patent provides mass-correlated ejection of ions from the ion guide in a desired sequence.

FIG. 2 is an exemplary schematic diagram 200 of a mass spectrometer. The mass spectrometer of FIG. 2 is described in the '388 Patent, for example. Apparatus 30 comprises a mass spectrometer including ion source 20, ion guide 24, and TOF mass analyzer 28. Ion source 20 can include any type of source compatible with the purposes described herein, including for example sources which provide ions through electrospray ionization (ESI), matrix-assisted laser desorption ionization (MALDI), ion bombardment, application of electrostatic fields (e.g., field ionization and field desorption), chemical ionization, etc.

Ions from ion source 20 may be passed into an ion manipulation region 22, where ions can be subjected to ion beam focusing, ion selection, ion ejection, ion fragmentation, ion trapping, or any other generally known forms of ion analysis, ion chemistry reaction, ion trapping or ion transmission. Ions so manipulated can exit the manipulation region 22 and pass into an ion guide indicated by 24.

Ion guide 24 defines axis 174 and comprises inlet 38, exit 42 and exit aperture 46. Ion guide 24 is adapted to generate or otherwise provide an ion control field comprising a component for restraining movement of ions in directions normal to the guide axis and a component for controlling the movement of ions parallel to the guide axis.

Ion guide 24 may include multiple sections or portions and/or auxiliary electrodes. As will be explained in greater detail below, ion guide 24 of spectrometer 30 is operable to eject ions of different masses and/or m/z ratios from exit 42, while maintaining radial confinement along axis 174 within and beyond the ion guide 24, such that the ions arrive at a desired point substantially along the axis of the ion guide, or in a desired proximity thereto, such as within extraction region 56 of TOF mass analyzer 28, adjacent to push plate 54, at substantially the same time, or in a desired sequence.

Ions ejected from ion guide 24 can be focused or otherwise processed by further apparatus, as for example electrostatic lens 26 (which may be considered a part of guide 24) and/or mass analyzer 28. Spectrometer 30 can also include devices such as push plate 54 and accelerating column 55, which may, for example, be part of an extraction mechanism of mass analyzer 28.

FIG. 3 is an exemplary schematic diagram 300 of the ion guide, electrostatic lens, and mass analyzer of the '388 Patent along with an accumulation potential profile of the ion guide. Accumulation potential profile 58 of FIG. 3 represents relative potential values, such as voltages or pressures, provided along axis 174 of ion guide 24. The relative potential at portion **34*a* of ion guide 24 is indicated at 90, the potential provided at portions 34*b* and 34*c* at 91, and the potential gradient provided across portion 34*c* of the ion guide 24 and exit 42 of aperture 46 at 92. Although not shown, an RF voltage is applied to ion guide 24 for providing confinement of the ions in the radial direction. Thus, an ion control field comprising a component for restraining movement of ions in directions normal to the guide axis and a component for controlling the movement of ions parallel to the guide axis is provided in ion guide 24**.

Provision of an accumulation potential 58 such as that shown in FIG. 3 within ion guide 24 allows large ions 62 (i.e., ions having large m/z values) and small ions 66 (i.e., ions having small m/z values) to traverse ion guide 24 in a direction parallel to axis 174 and settle into the preferential region proximate to electrodes **34*b* and 34*c* provided by the low potential at 91, but prevents them from exiting the ion guide 24 by providing a higher potential on the aperture 46. As will be familiar to those skilled in the relevant arts, it may be beneficial in some circumstances to apply a DC offset voltage on ion guide 24 in addition to the DC voltage mentioned above. In that instance, the overall potential profile 58** would be elevated by the corresponding DC offset voltage.

FIG. 4 is an exemplary schematic diagram 400 of the ion guide, electrostatic lens, and mass analyzer of the '388 Patent along with a pre-ejection potential profile of the ion guide. Pre-ejection potential profile 70 of FIG. 4 represents relative potential values, such as voltages or pressures, provided along axis 174 of ion guide 24. In the example shown in FIG. 4, pre-ejection profile 70 is similar to that described for accumulation potential profile 58 of FIG. 3, but with potential 91 replaced by potential 96 at portion **34*b* of the ion guide 24 and corresponding changes in potential gradient 92. Thus, a modified ion control field comprising a component for restraining movement of ions in directions normal to the guide axis and a component for controlling the movement of ions parallel to the guide axis is provided in ion guide 24**.

Provision of a pre-ejection profile 70 such as that shown in FIG. 4 can, for example, be used to cause ions 62 of relatively larger m/z and ions 66 of relatively smaller m/z to move within ion guide 24 in a direction parallel to axis 174 and settle within the region of ion guide 24 between portion **34*b* of the guide and aperture 46. The potential at 96 can also prevent additional ions from entering ion guide 24 to a point beyond portion 34*b***.

FIG. 5 is an exemplary schematic diagram 500 of the ion guide, electrostatic lens, and mass analyzer of the '388 Patent along with an ejection potential profile of the ion guide. Ejection potential profile 74 of FIG. 5 can be created by, for example, applying an alternating current ("AC") voltage within portion **34*c* of ion guide 24 and/or at an exit aperture 46, superimposed on voltages otherwise applied to the ion guide 24. For example, appropriate RF and DC potentials may be applied to opposed pairs of electrodes within an ion guide 24, along with suitable DC offset voltages applied to various sets of electrodes. The AC voltage can, for example, be superimposed over the RF voltage, while a difference between a potential at portion 34*c* and a potential at exit aperture 46** is reduced.

Ejection potential profile 74 along the axis of guide 24 can be provided by, for example, using a pseudopotential such as that represented by dashed lines at reference 78 in FIG. 5.

For example, at the beginning of an ejection cycle such as cycle 74 represented in FIG. 5, the magnitude or depth of a pseudopotential 78 may be chosen so that ions 62 of larger m/z ratios will leave exit 42 first. As the larger m/z ions 62 are released, the amplitude of the AC voltage may be gradually reduced to change the depth of the pseudopotential 78 well, and after a desired delay, to allow ions 66 of smaller m/z to leave ion guide 24. The delay may be determined by controlling the rate of change of the AC amplitude, and may, for example, be chosen based on the masses and/or m/z ratios of ions 62 and 66 to achieve a desired delay. In the situation shown in FIG. 5, ions 66 of smaller m/z travel faster than the ions 62 of larger m/z and gradient 78 is set accordingly. Gradient 78 is used to describe a variation of some parameter in space, but not in time.

Ions are provided to a desired point in space 56 disposed on, or substantially along, guide axis 174, as for example an extraction region in a TOF analyzer for detection and mass analysis using methods generally known in the art. This is represented at the right-hand portion of FIG. 5, where the different rates of travel of ions 62 and 66 have resulted in ions 62 and 66 reaching the orthogonal extraction region 56 in front of push plate 54, at substantially the same time. At this point, an extraction pulse 82 may be applied to push plate 54 to pulse ions 62, 66 through the accelerating column 55.

On-Demand Concentration of Ion Packets in IDA

In a paper entitled "A Novel Ion Trap That Enables High Duty Cycle and Wide m/z Range on an Orthogonal Injection TOF Mass Spectrometer" by Alexander V. Loboda and Igor V. Chernushevich published in the Journal of the American Society of Mass Spectrometry in July of 2009, vol. 20, no. 7, (hereinafter the "Loboda Paper") it was suggested that the method of concentrating ion packets described in the '388 Patent could be applied "on-demand" in IDA acquisitions. The Loboda Paper refers to the method of concentrating ion packets described in the '388 Patent as Zeno pulsing.

The Loboda Paper found that Zeno pulsing "enables almost 100% duty cycle over a wide m/z-range from 120 to 2000, resulting in sensitivity gains from 3 to 14 without loss of mass accuracy or resolution." However, due to the "reduced linear dynamic range, the application strategy may involve using this method in MS/MS only, where intensities are in general several orders of magnitude lower than in TOF MS, and where an average gain of 7 is more valuable."

Sensitivity gain is the observed change in ion current per given mass range, for example. The linear dynamic range of a detection subsystem is, for example, the maximum linear response signal divided by the signal at the limit of detection (LOD).

In other words, the Loboda Paper found that although Zeno pulsing allowed a wide m/z-range to be analyzed at once, the larger number of ions detected could cause the detection subsystem to saturate more easily thereby reducing the linear dynamic range.

As a result, the Loboda Paper suggested applying Zeno pulsing on-demand in IDA acquisition experiments that are triggered by low intensity precursor ions found in the single MS experiments where large sensitivity gains are more valuable. As described above, in an IDA method, a single precursor ion or mass spectrometry (MS) survey scan is performed to generate a precursor ion peak list. MS/MS is then performed on each precursor ion of the list. MS/MS is repeatedly performed on the precursor ions of the list as the sample is being introduced into the tandem mass spectrometer, for example.

As a result, the Loboda Paper suggested monitoring the single MS survey scan for precursor ions with intensities below a certain threshold. For those precursor ions with intensities below the threshold, Zeno pulsing would be turned on for the one or more MS/MS experiments of each precursor ion.

FIG. 6 is an exemplary diagram 600 showing the MS (precursor ion) spectra and MS/MS (product ion spectra) of an on-demand IDA method of the Loboda Paper. In the IDA method, a single MS survey scan is performed, producing precursor ion spectrum 601. From precursor ion spectrum 601 an IDA precursor ion peak list is obtained. In this case, the peak list only includes precursor ions 610, 620, and 630.

The Loboda Paper describes performing on-demand Zeno pulsing "in those MS/MS experiments that are triggered by low intensity precursor ions in single MS experiments." In FIG. 6, for example, precursor ion 610 is below an intensity threshold 640, and precursor ions 620 and 630 are above intensity threshold 640. As a result, precursor ion 610 is a low intensity precursor ion in precursor ion spectrum 601 of a single MS experiment.

Consequently, Zeno pulsing is performed in the MS/MS experiment of precursor ion 610. The MS/MS experiment of precursor ion 610 is represented in FIG. 6 by product ion spectrum 611.

In precursor ion spectrum 601, however, precursor ions 620 and 630 are above intensity threshold 640, so Zeno pulsing is not performed in the MS/MS experiments of precursor ions 620 and 630. The MS/MS experiments of precursor ions 620 and are represented in FIG. 6 by product ion spectra 621 and 631, respectively.

As shown in FIG. 6, on-demand Zeno pulsing of the Loboda paper entails selectively using Zeno pulsing in product ion experiments based on the intensity of precursor ions in a single precursor ion experiment.

One aspect of the implementation of Zeno pulsing in the Loboda Paper effectively limits on-demand Zeno pulsing to IDA acquisition experiments. This aspect is the switching between normal mode and Zeno pulsing mode. More specifically, the Loboda Paper describes that, when switching between the two modes, the TOF repetition or pulsing rate is changed. It lists a TOF repetition rate of between 13 and 18 kHz for normal mode and a rate of between 1 and 1.25 kHz for Zeno pulsing mode.

This change in the TOF repetition rate is not instantaneous. The electronics of the TOF accelerator need time to settle. A pause may be needed for example to maintain the same pulse amplitude after changing the repetition rate. The Loboda Paper describes this switching time or settle time to be in the millisecond range, which was more likely tens or hundreds of milliseconds. As a result, the implementation of the Loboda Paper requires a delay in switching between the normal and Zeno pulsing modes.

FIG. 7 is an exemplary timing diagram 700 showing the two different TOF extraction pulses of a TOF mass analyzer for normal pulsing mode and Zeno pulsing mode and the settle time needed for switching between the two modes. In region 710 normal extraction pulsing is occurring every 0.1 ms for a TOF repetition rate of 10 kHz. Note that this repetition rate is used for illustrative purposes and the normal TOF repetition rate is typically higher as described above.

At 1 ms, the TOF repetition rate is switched to 1 kHz for Zeno pulsing. However, the electronics of the TOF accelerator need time to settle. In FIG. 7, region 720 represents 10 ms of settle time. Again, a 10 ms period for the settle time is used for illustrative purposes and the actual settle time can typically be longer as described above.

After the settle time, the TOF mass analyzer continues to analyze the sample at the TOF repetition rate of about 1 kHz. This repetition rate translates to one pulse every 1 ms, which is shown in region 730.

FIG. 7 illustrates that the settle time or switching time between the normal and Zeno pulsing modes as described in the Loboda paper is significant when compared to normal and Zeno pulsing periods. Although significant, the Loboda paper, found this delay to be acceptable for an IDA acquisition method. This is because IDA acquisition is typically used for identification where the precise shape or area of a particular chromatographic peak is not necessary. In other words, in IDA identification methods, it is not as necessary to quickly switch between normal and Zeno pulsing modes as it may be in other methods such as targeted methods for quantification.

On-Demand Concentration of Ion Packets in Targeted Methods

U.S. patent application Ser. No. 16/980,956 (hereinafter the "'956 Application") describes systems and methods for switching between normal and Zeno pulsing modes in acquisition methods other than IDA. As described in the '956 Application, the large gain in sensitivity produced by Zeno pulsing is obtained and saturation is avoided by dynamically switching between Zeno pulsing mode and normal pulsing mode within the same quantitative targeted acquisition experiment. In addition, the switching between pulsing modes is triggered by the intensity of a previous product ion. In other words, if the intensity of a previous product ion exceeds a certain threshold, Zeno pulsing mode is turned off and normal pulsing mode is turned on. Similarly, if the intensity of a previous product ion is less than or equal to a certain threshold, normal pulsing mode is turned off and Zeno pulsing mode is turned back on.

FIG. 8 is an exemplary diagram 800 showing how dynamic switching between Zeno pulsing mode and normal pulsing mode is used to obtain an XIC in a quantitative targeted acquisition method with increased sensitivity and without saturation. In FIG. 8, the product ion intensity for the same single precursor ion to product ion transition 801 is measured at nine different time steps or cycles. At each time step, the precursor ion of transition 801 is selected and fragmented, and the intensity of the product ion of transition 801 is measured.

Initially, the intensities of the product ion of transition 801 are measured using the Zeno pulsing mode. For example, at time steps 1, 2, and 3, the intensities are measured using the Zeno pulsing mode. Zeno pulsing is used initially because the intensities are low and can benefit from the higher sensitivity of Zeno pulsing. The intensities at time steps 1, 2, and 3 are shown plotted in chromatogram 810.

In order to prevent saturation, the intensities at time steps 1, 2, and the 3 are each compared to a Zeno pulsing mode intensity threshold 815, for example. If the measured intensity is greater than Zeno pulsing mode intensity threshold 815 and the previously measured intensity in Zeno pulsing mode is less than the measured intensity, then the tandem mass spectrometer is switched from Zeno pulsing mode to normal pulsing mode. For example, at time step 3, the measured intensity is greater than Zeno pulsing mode intensity threshold 815. The measured intensity at time step 3 is also greater than the measured intensity at time step 2, showing that the measured ion intensity is increasing. As a result, saturation is likely, so the pulsing mode is switched to normal mode.

At time step 4, the intensity of the product ion of transition 801 is now measured using the normal pulsing mode. This intensity is plotted in chromatogram 820. Note that in normal pulsing mode the intensities are reduced to 1/7 the intensities in Zeno pulsing mode. Consequently, saturation is prevented.

Mass analysis continues in normal pulsing mode until the measured intensity decreases below a normal pulsing mode intensity threshold 825. For example, normal pulsing mode is used to measure the intensity at time steps 5 and 6 in addition to time step 4.

At time step 6, however, the measured intensity is less than normal pulsing mode intensity threshold 825. In addition, the measured intensity at time step 6 is also less than the measured intensity at time step 5, showing that the measured ion intensity is decreasing. As a result, saturation is not likely to occur, so the Zeno pulsing mode is switched back on to increase sensitivity. Consequently, at time steps 7, 8, and 9, the intensities are measured using the Zeno pulsing mode. The intensities at time steps 7, 8, and 9 are shown plotted in chromatogram 810.

Due to the switching from Zeno mode pulsing to normal mode pulsing and back again to Zeno mode pulsing, the intensities of the product ion of transition 801 in chromatograms 810 and 820 must be combined to calculate an XIC peak. However, the scales of intensity in chromatograms 810 and 820 differ by a factor of 7.

As a result, the intensities of one of the chromatograms need to be scaled or normalized to the intensities of the other chromatogram. Because calibration data used for the quantitation is typically obtained in normal pulsing mode, the intensities measured using Zeno pulsing mode are preferably normalized to the intensities measured using normal pulsing mode. In other words, and as shown in FIG. 8, the intensities of chromatogram 810 are scaled or normalized to the intensities of chromatogram 820 producing chromatogram 830.

Note that the factor of 7 is an average Zeno pulsing gain for the particular instrument described in Loboda Paper. In reality it is different depending on the geometry of the machine, and is also different for ions with different m/z, varying from 3 to about 25. There is a theoretical gain formula for predicting gain dependence on m/z value $$\text{Gain} = C\sqrt{\frac{(m/z)_{max}}{(m/z)}},$$

where C is a geometrical factor, (m/z)max is the largest value of m/z recorded in spectra.

Now that chromatogram 820 and chromatogram 830 have the same intensity scale, they can be combined. For example, chromatogram 820 and chromatogram 830 are added producing chromatogram 840. An XIC peak 845 is finally calculated from chromatogram 840. XIC peak 845 is used for quantitation.

FIG. 8 shows that by basing the dynamic switching between Zeno and normal pulsing modes on a product ion rather than a precursor ion, as suggest in the Loboda Paper, dynamically controlled Zeno pulsing mode can be used in a targeted acquisition method. As implemented in the Loboda paper, such mode switching was not fast enough for targeted acquisition because of the required settle time between modes.

In the '956 Application, dynamic switching between Zeno and normal pulsing modes is implemented without changing the TOF repetition rate. As a result, there is no settle time delay between modes.

SUMMARY

A system, method, and computer program product are disclosed for calibrating the gain of Zeno pulsing mode. More specifically, all three embodiments are directed to calibrating gain of an ion guide and a TOF mass analyzer in concentrating (Zeno mode) product ions with different m/z values before injection into the TOF mass analyzer in comparison to not concentrating (normal mode) the product ions. All three embodiments include the following steps.

A sample containing a known compound is continuously received and ionized using an ion source device, producing an ion beam.

Product ions fragmented from a known precursor ion of the known compound selected from the ion beam are received using an ion guide defining a guide axis.

Product ions ejected from the ion guide are received into an extraction region of a TOF mass analyzer downstream of the ion guide.

The ion guide is instructed to eject the product ions of the known precursor ion using a sequential or Zeno pulsing mode and the TOF mass analyzer is instructed to measure the intensities of the product ions at a first group of time steps of two or more time steps using a processor, producing a sequential group of mass spectra.

The ion guide is instructed to switch to a continuous or normal pulsing mode and the TOF mass analyzer is instructed to measure the intensities of the product ions at a second group of time steps of the two or more time steps using the processor, producing a continuous group of mass spectra.

A gain is calculated for the sequential mode in comparison to the continuous mode as a series of ratios of intensities of one or more product ions of the product ions obtained from a combination of the sequential group of mass spectra to corresponding intensities of the one or more product ions obtained from a combination of the continuous group of mass spectra using the processor.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
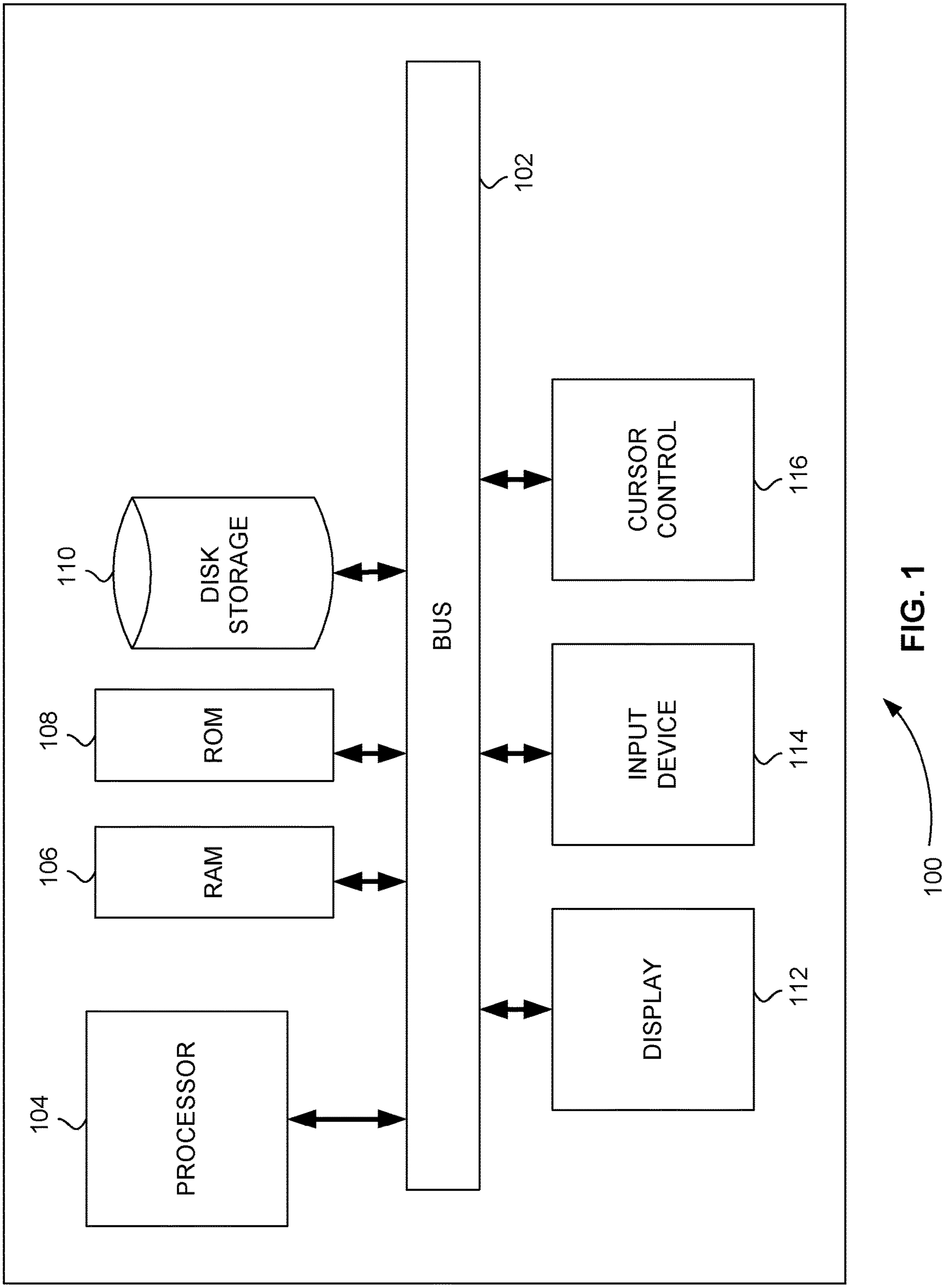
FIG. 1 is a block diagram that illustrates a computer system, upon which embodiments of the present teachings may be implemented.
Figure 2:
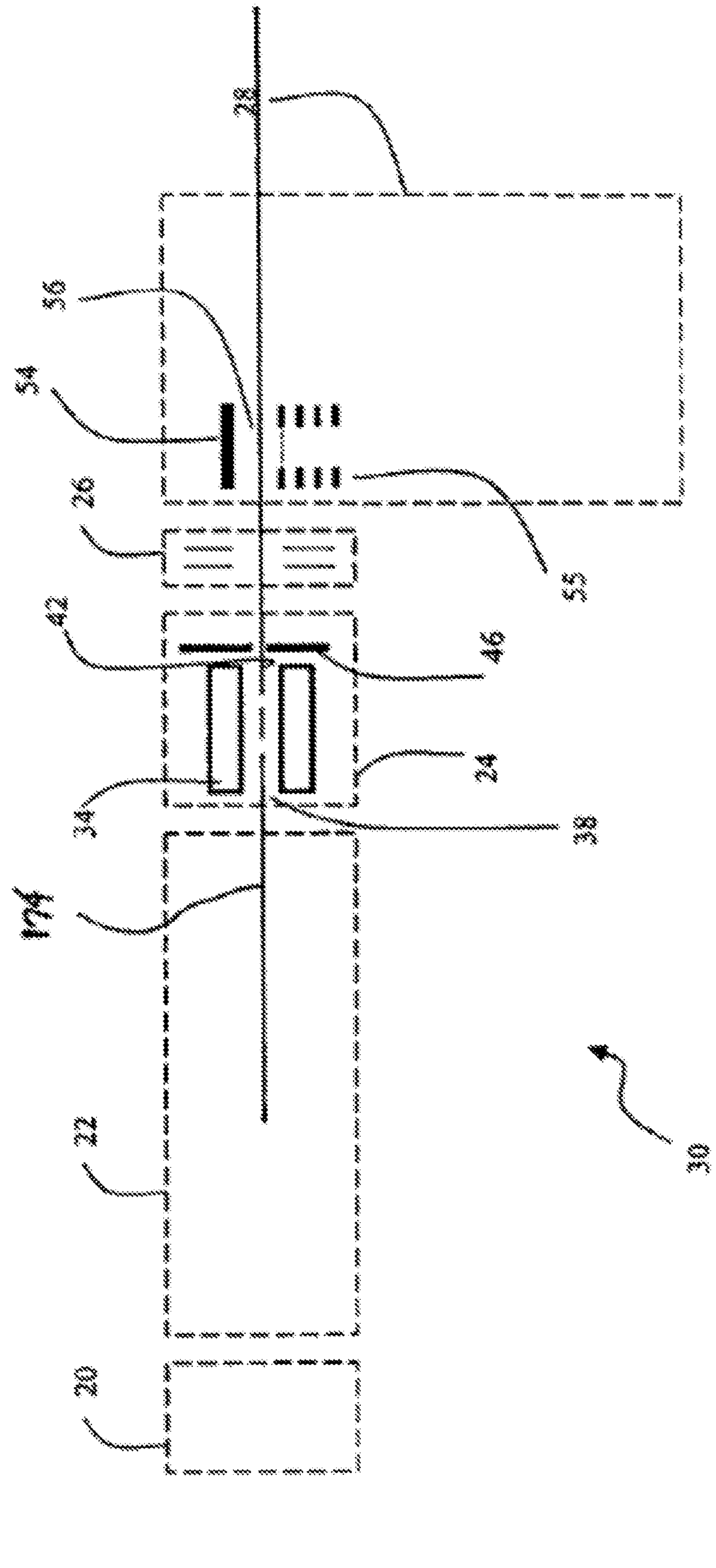
(PRIOR ART) FIG. 2
FIG. 2 is an exemplary schematic diagram of a mass spectrometer.
Figure 3:
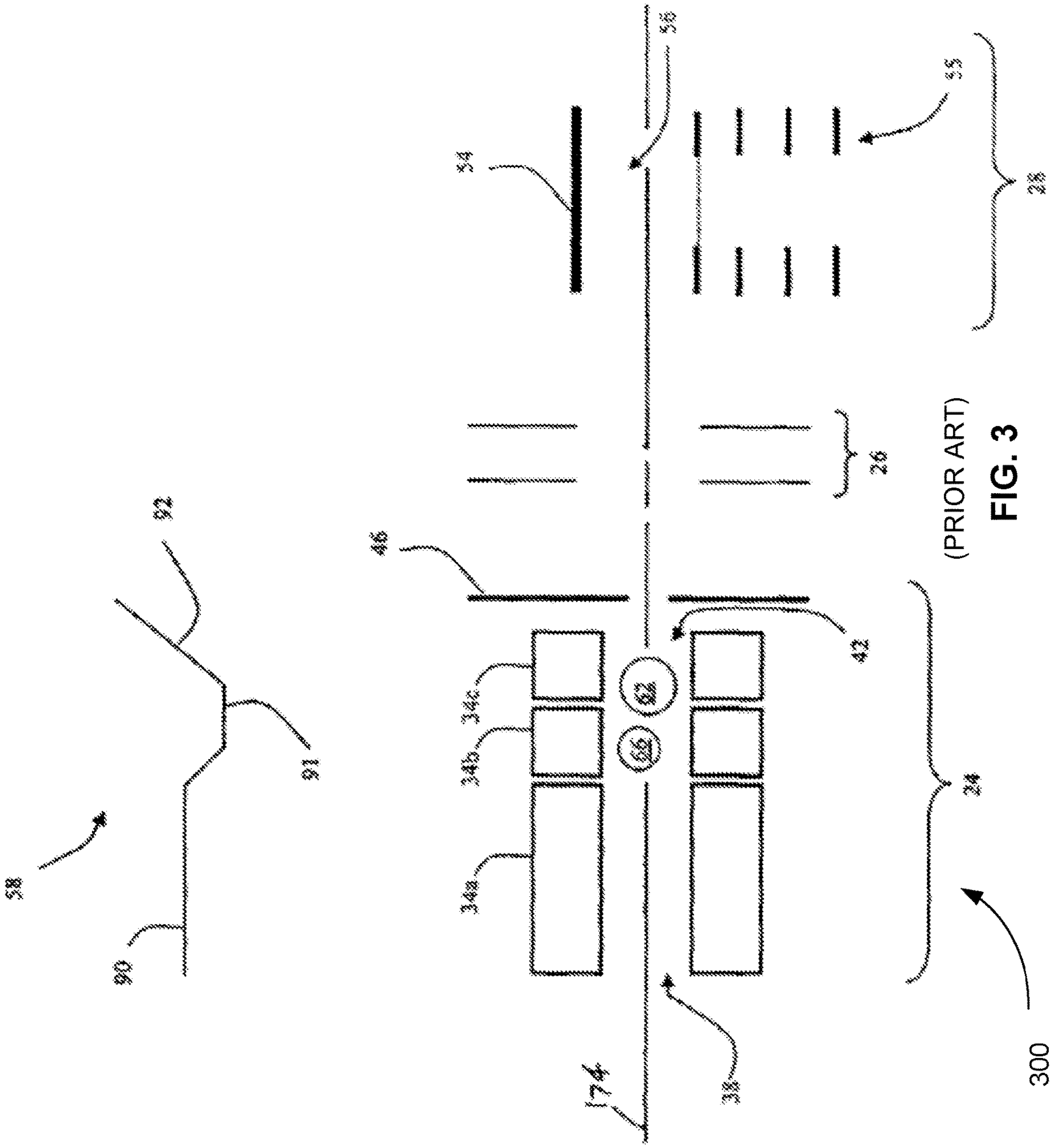
(PRIOR ART) FIG. 3
FIG. 3 is an exemplary schematic diagram of the ion guide, electrostatic lens, and TOF mass analyzer of the '388 Patent along with an accumulation potential profile of the ion guide.
Figure 4:
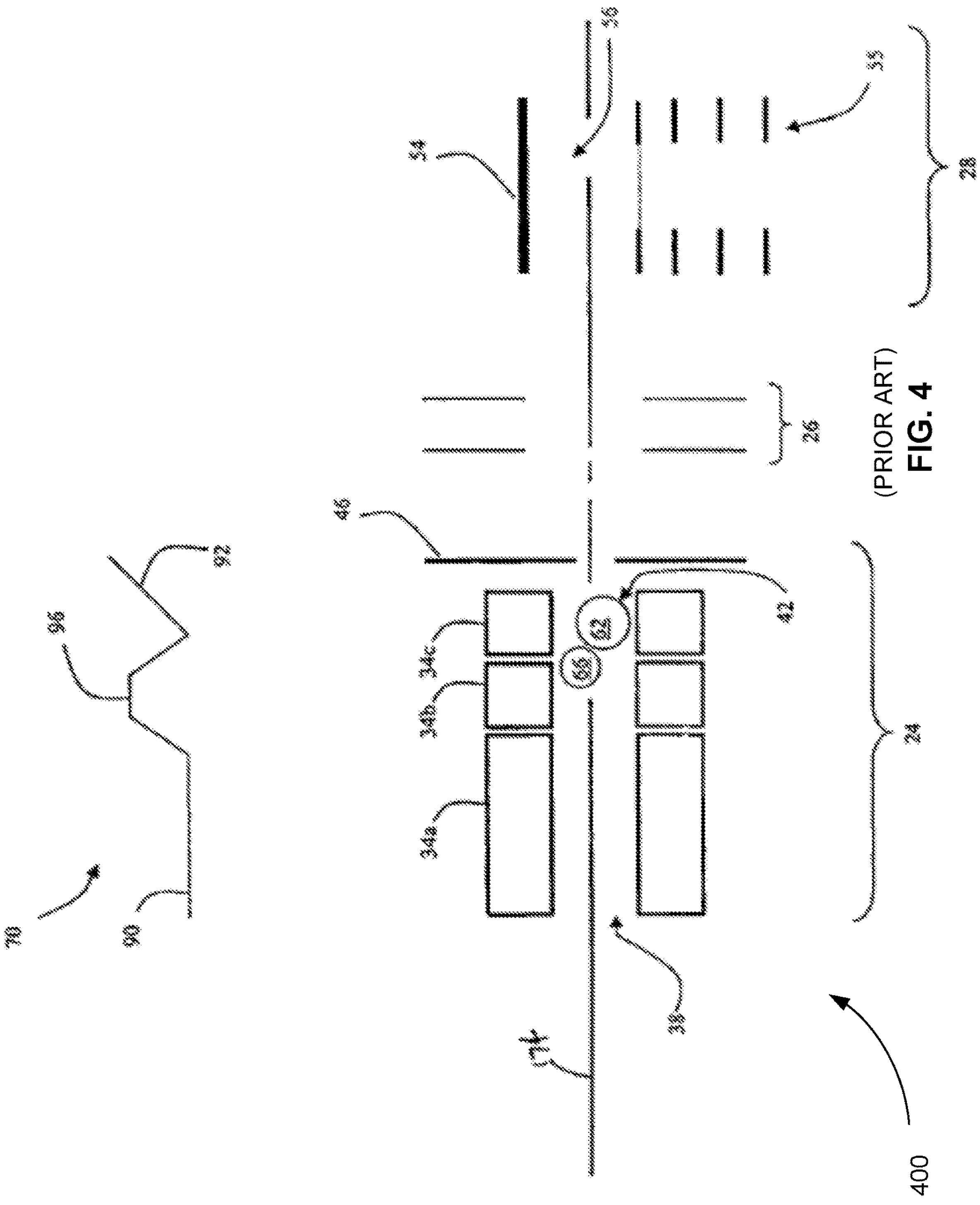
(PRIOR ART) FIG. 4
FIG. 4 is an exemplary schematic diagram of the ion guide, electrostatic lens, and TOF mass analyzer of the '388 Patent along with a pre-ejection potential profile of the ion guide.
Figure 5:
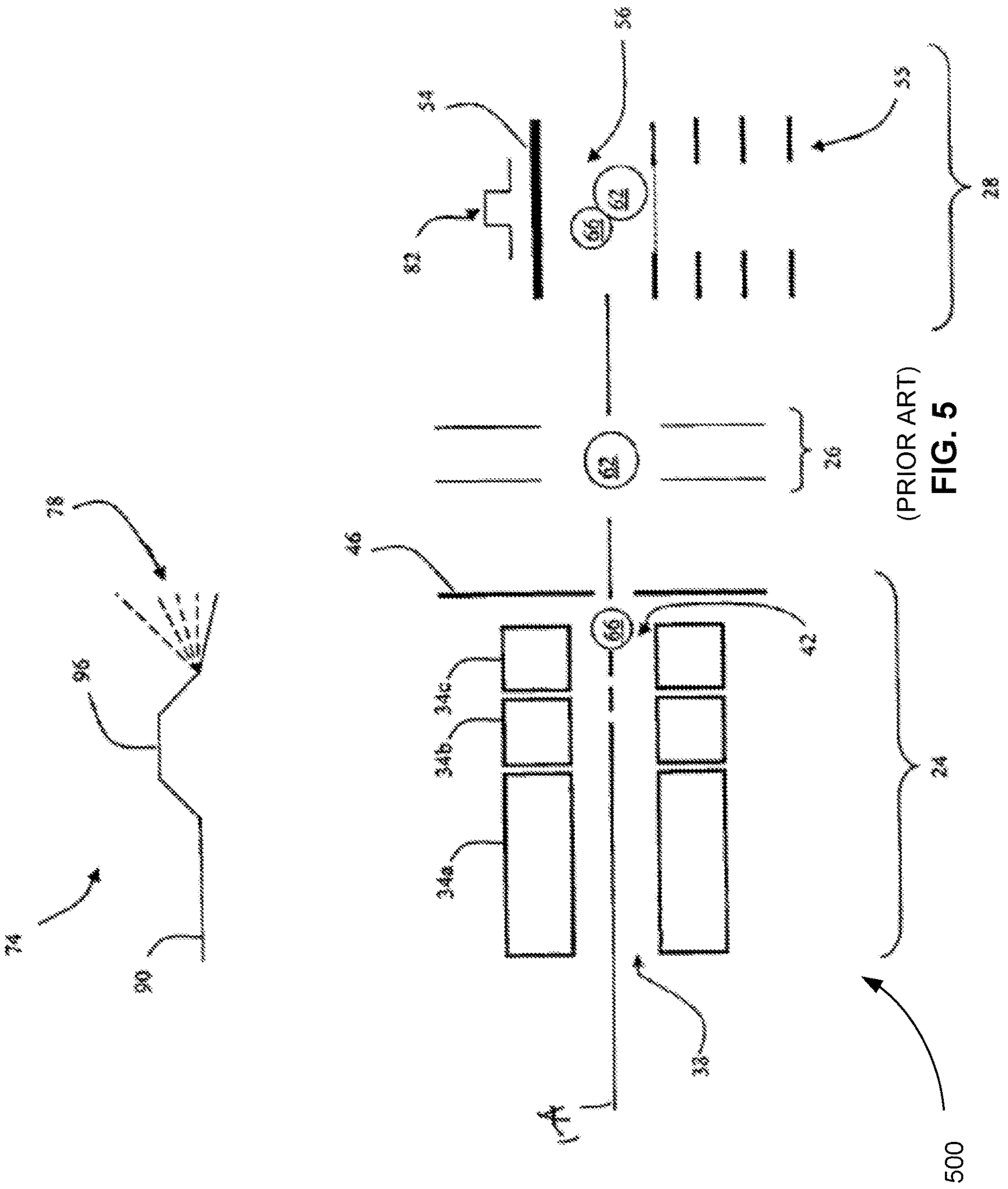
(PRIOR ART) FIG. 5
FIG. 5 is an exemplary schematic diagram of the ion guide, electrostatic lens, and TOF mass analyzer of the '388 Patent along with an ejection potential profile of the ion guide.
Figure 6:
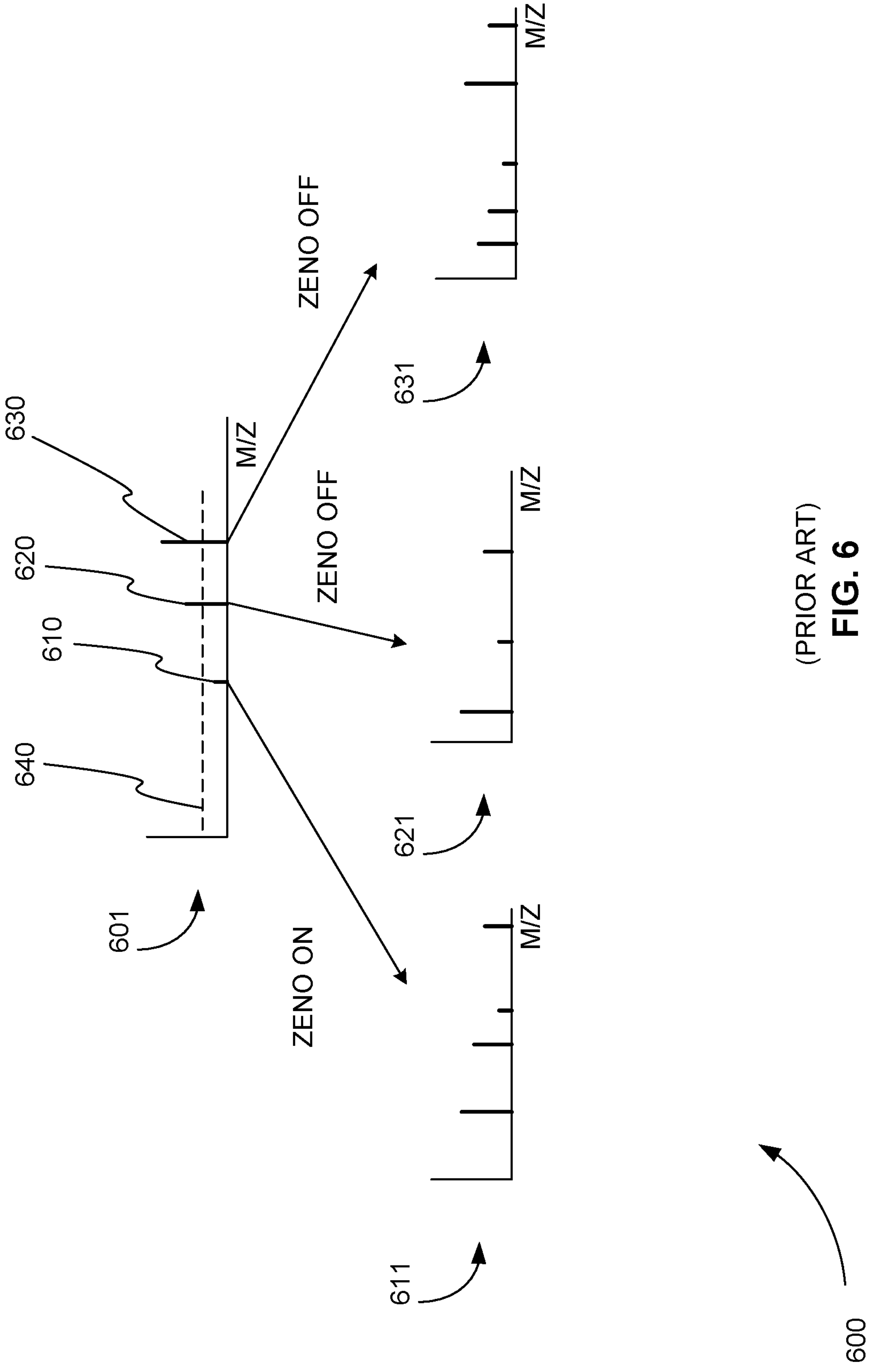
(PRIOR ART) FIG. 6
FIG. 6 is an exemplary diagram showing the MS (precursor ion) spectra and MS/MS (product ion spectra) of an on-demand IDA method of the Loboda Paper.
Figure 7:
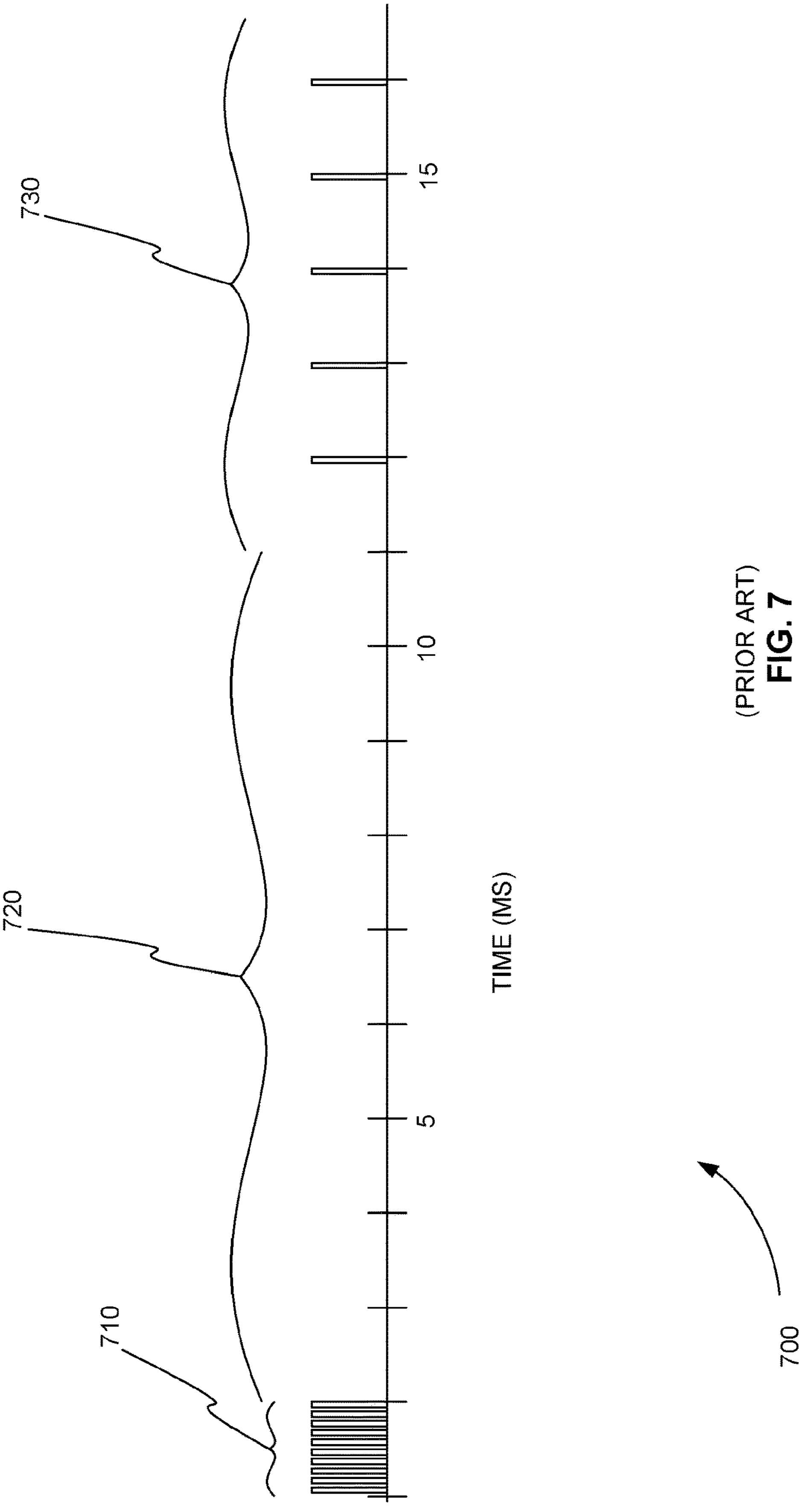
(PRIOR ART) FIG. 7
FIG. 7 is an exemplary timing diagram showing the two different TOF extraction pulses of a TOF mass analyzer for normal pulsing mode and Zeno pulsing mode and the settle time needed for switching between the two modes.
Figure 8:
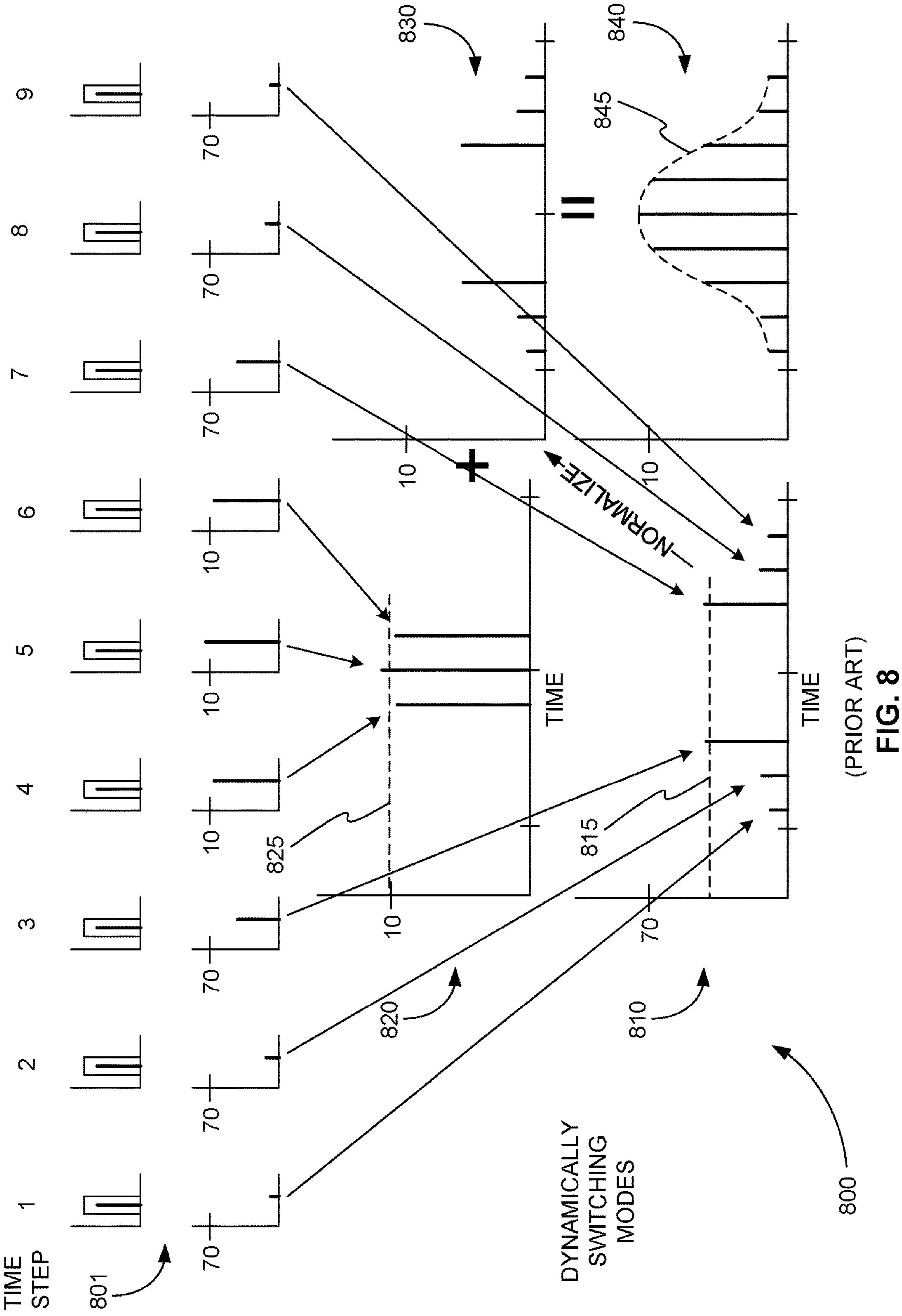
(PRIOR ART) FIG. 8
FIG. 8 is an exemplary diagram showing how dynamic switching between Zeno pulsing mode and normal pulsing mode is used to obtain an XIC in a quantitative targeted acquisition method with increased sensitivity and without saturation.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and precursor ion mass selection media. Non-volatile media includes, for example, optical or magnetic disks, such as storage device 110. Volatile media includes dynamic memory, such as memory 106. Precursor ion mass selection media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Zeno Pulsing Gain Calibration

As described above, Zeno pulsing refers to a method of operating a specially configured ion guide to concentrate ions for mass analysis. This method of concentrating ions can produce sensitivity gains over a wide m/z range without a loss of mass accuracy or resolution. One problem with Zeno pulsing, however, is that the large increase in sensitivity can result in saturation at the detector of the tandem mass spectrometer.

One solution to this problem is a method of dynamically turning on and off Zeno pulsing called on-demand Zeno pulsing. For such on-demand Zeno pulsing acquisitions, it is necessary to scale down the intensities of Zeno pulsing mode data or scale up the intensities of normal pulsing mode data using the theoretical gain formula.

Unfortunately, the actual gain of an instrument is rarely within five percent of the theoretical gain formula. As a result, it is not possible to scale the data accurately for quantitation using the theoretical gain alone.

Figure 9:
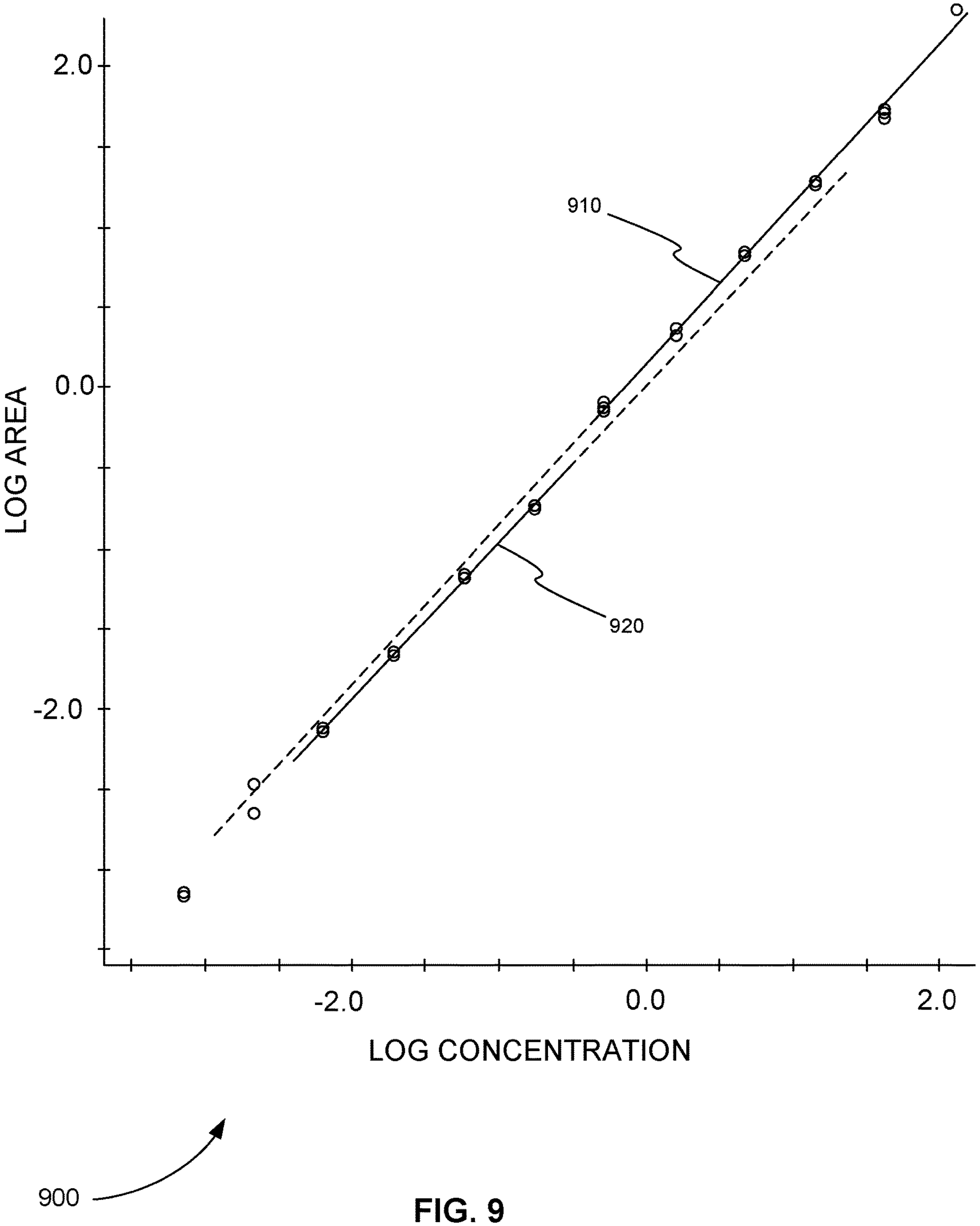
FIG. 9 is an exemplary plot of peak area versus compound concentration showing how quantitation data from on-demand Zeno pulsing can appear as two separate lines when the theoretical gain formula is used.

FIG. 9 is an exemplary plot 900 of peak area versus compound concentration showing how quantitation data from on-demand Zeno pulsing can appear as two separate lines when the theoretical gain formula is used. Plot 900 depicts a linear dynamic range quantitation curve. The y-axis of plot 900 represents the peak area and the x-axis represents different concentrations of the same compound. Concentration measurements spanning 4 to 5 orders of magnitude are depicted for the compound alprazolam.

Plot 900 shows the measurements made using on-demand Zeno pulsing. Peak areas for the lower concentrations were found using Zeno pulsing. Peak areas for the higher concentrations were found using normal pulsing. The peak areas for the lower concentrations were scaled down using the theoretical gain. Line 910 is drawn through the peak areas found for higher concentrations of aprazolam using normal pulsing. Line 920 is drawn through the peak areas found for lower concentrations of aprazolam using Zeno pulsing. Lines 910 and 920 have two different slopes. These two separate lines show that it is not possible to scale the data accurately for quantitation using the theoretical gain alone using this particular mass spectrometer.

Consequently, there is a need for additional systems and methods for scaling the data produced by on-demand Zeno pulsing to provide one consistent set of measured data which are aligned with the data produced by normal pulsing.

In various embodiments, each tandem mass spectrometer can be modified to produce the theoretical gain, within some percentage of tolerance, such as plus or minus 5%. Experimentation has shown that some mass spectrometers produce the theoretical gain, while others do not. In practice, modifying the hardware of each instrument to produce the theoretical gain is difficult. There are many different sources of error. Also, the change from theoretical gain can be produced by the use of the device. In other words, as the device gets "dirty" from different experiments, the gain may change.

In various embodiments, during an actual experiment, both normal and Zeno pulsing can be applied to the analyte of interest to determine the gain. In other words, the actual gain is obtained on the fly. Unfortunately, this increases the amount of time needed for the experiment significantly. It also increases the complexity of the scanning.

In various embodiments, two separate calibration curves, like those shown in FIG. 9 can be constructed and used for each instrument. One calibration curve (e.g., 920) would be used for quantitation of lower concentration samples and the other calibration curve (e.g., 910) would be used for quantitation of higher concentration samples. Unfortunately, this method is also time-consuming and can disrupt the workflows of many customers.

In a preferred embodiment, a calibration of the gain in the signal produced by Zeno pulsing is performed by using a known compound with fragment ion peaks across the m/z range of interest. This allows the calculation of an empirical gain scale factor which is subsequently applied to either the Zeno pulsing data or normal pulsing data (depending on the desired implementation), either at run-time or post-acquisition. This allows linear quantitation across all acquisitions in the calibration curve, including those where the sensitivity gain technique is applied in a dynamic fashion. This yields a single linear quantitation curve rather than the divergent curves (FIG. 9) observed when the theoretical gain is used. The gain calibration can be calculated in an m/z-dependent fashion or as a single scale factor for all m/z values, depending on the performance of the gain technique.

Figure 10:
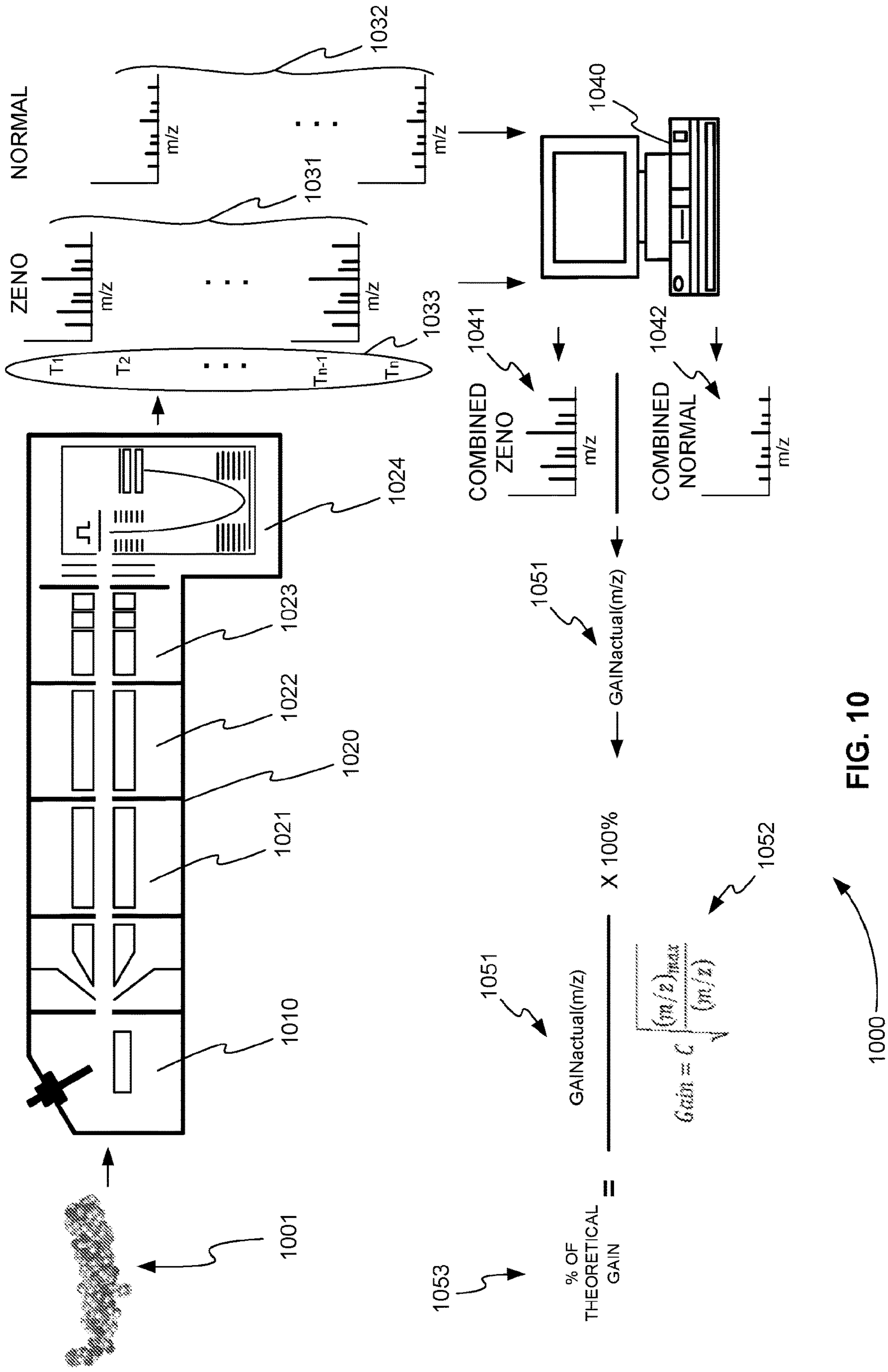
FIG. 10 is an exemplary diagram showing a system for calibrating the gain in intensity produced by Zeno pulsing versus normal pulsing using a known compound with fragment ion peaks across the m/z range of interest, in accordance with various embodiments.

FIG. 10 is an exemplary diagram 1000 showing a system for calibrating the gain in intensity produced by Zeno pulsing versus normal pulsing using a known compound with fragment ion peaks across the m/z range of interest, in accordance with various embodiments. A known compound 1001 is selected. Preferably known compound 1001 is selected to produce product ions across a large m/z range, to produce product ions with predictable intensities, and to produce product ions that are stable over time.

In a preferred embodiment, known compound 1001 is a known calibrant. In various alternative embodiments, known compound 1001 can be a known analyte of an experiment.

Known compound 1001 is, for example, a peptide with an m/z of 829. This peptide produces eight product ions that are evenly spaced between 86 and 724 m/z, that have predictable intensities, and that are stable over time.

Known compound 1001 is analyzed using MRM-HR, for example. As described above, in MRM-HR, looped MS/MS spectra are collected at high-resolution with short accumulation times, and then fragment ions (product ions) are extracted post-acquisition.

Like any other MRM-HR method, ion source device 1021 continuously receives and ionizes a sample containing known compound 1001. Mass filter 1021 of tandem mass spectrometer 1020 selects a precursor ion of known compound 1001. For example, a precursor ion with an m/z of 829 is selected. Fragmentation device 1022 of tandem mass spectrometer 1020 fragments all precursor ions with an m/z of 829 within some tolerance.

Unlike conventional MRM-HR methods, however, one or more product ions of known compound 1001 are mass analyzed using both Zeno pulsing mode and normal pulsing mode. Specifically, ion guide 1023 of tandem mass spectrometer 1020 is switched between these two modes to perform mass analysis by these two modes in TOF mass analyzer 1024 of tandem mass spectrometer 1020.

The one or more product ions of known compound 1001 can be analyzed once using both modes, producing a single product ion spectrum for each mode. Alternatively, the one or more product ions of known compound 1001 can be analyzed two or more times for each mode. As a result, one or more Zeno MS/MS product ion spectra 1031 are obtained for known compound 1001 using Zeno pulsing mode, and one or more normal MS/MS product ion spectra 1032 are obtained for known compound 1001 using normal pulsing mode.

In various embodiments, if the one or more product ions of known compound 1001 are analyzed two or more times for each mode, Zeno and normal mode analyses are preferably interleaved. Interleaving Zeno and normal modes of operation averages out the effects of the flow of known compound 1001 changing over time. In other words, interleaving averages out a signal that is increasing or decreasing overtime.

Interleaving preferably includes but does not require that one normal mode be performed after one Zeno mode. For example, one or more normal mode analyses may be performed between two Zeno mode analyses or one or more Zeno mode analyses may be performed between two normal mode analyses.

On current instruments, an analysis using either mode is on the order of 1 second. Typically, known compound 1001 is analyzed 30 times using each mode for a total of 60 seconds and each second the mode is switched from Zeno to normal or normal to Zeno. FIG. 10 shows that, at every other time step of two or more time steps 1033, Zeno pulsing is performed. At each time step between time steps at which Zeno pulsing is performed, normal pulsing is performed.

If one or more Zeno MS/MS product ion spectra 1031 include more than one spectrum, the spectra are combined to produce one combined Zeno spectrum 1041 using processor 1040, for example. The intensities of the product ions of the spectra are combined using a statistical method including, but not limited to, calculating a mean, mode, or median. If one or more Zeno MS/MS product ion spectra 1031 include just one spectrum, then that spectrum is combined Zeno spectrum 1041.

Similarly, if one or more normal MS/MS product ion spectra 1032 include more than one spectrum, the spectra are combined to produce one combined normal spectrum 1042. Again, the intensities of the product ions of the spectra are combined using a statistical method including, but not limited to a mean, mode, or median. If one or more normal MS/MS product ion spectra 1032 include just one spectrum, then that spectrum is combined normal spectrum 1042.

One or more product ions of combined Zeno spectrum 1041 and combined normal spectrum 1042 are compared to determine the actual Zeno pulsing gain 1051, using processor 1040. If known compound 1001 is the peptide at m/z 892, for example, the eight product ions between 86 and 724 m/z are compared. As shown in FIG. 10, the one or more product ions of combined Zeno spectrum 1041 and combined normal spectrum 1042 are compared, for example, by calculating a ratio of the intensity of each Zeno product ion to the intensity of its corresponding normal product ion.

If only one product ion is compared in combined Zeno spectrum 1041 and combined normal spectrum 1042, then actual Zeno pulsing gain 1051 is a single value. If two or more product ions are compared in combined Zeno spectrum 1041 and combined normal spectrum 1042, then actual Zeno pulsing gain 1051 can have multiple values that are a function of m/z. Processor 1040 can further calculate Zeno pulsing gain 1051 as a function of m/z from these values as shown in FIG. 10. As described above, the gain calibration is then calculated in an m/z-dependent fashion.

In practice, it has been found that the gain does not vary significantly with m/z for some instruments. As a result, in various embodiments, if actual Zeno pulsing gain 1051 has different values that are a function of m/z, these values can be combined to produce a single gain factor. The gains of the product ions of the spectra are combined using a statistical method including, but not limited to, calculating a mean, mode, or median. As described above, the gain calibration (Zeno pulsing gain 1051) is then calculated as a single scale factor for all m/z values.

Whether a single value or function of m/z, Zeno pulsing gain 1051 is the gain calculated for known compound 1001. In order to find a signal value or function of m/z that can be used for all experiments after calibration, Zeno pulsing gain 1051 is compared to the theoretical gain of the instrument 1052. Specifically, this comparison is a calculation of the percentage of theoretical gain 1053 that Zeno pulsing gain 1051 represents. Percentage of theoretical gain 1053 can also be a single value or function of m/z.

For each experiment after calibration, either the normal pulsing data is scaled up to the Zeno pulsing data, or the Zeno data is scaled down to the normal pulsing data. Percentage of theoretical gain 1053 is used to determine the scaling factor. Specifically, the scaling factor is the theoretical gain 1052 multiplied by percentage of theoretical gain 1053 and divided by 100. For example, if percentage of theoretical gain 1053 is 80% and theoretical gain 1052 is 10, then the scaling factor is 8. So, either normal pulsing data is multiplied by 8 or Zeno data is divided by 8.

Figure 11:
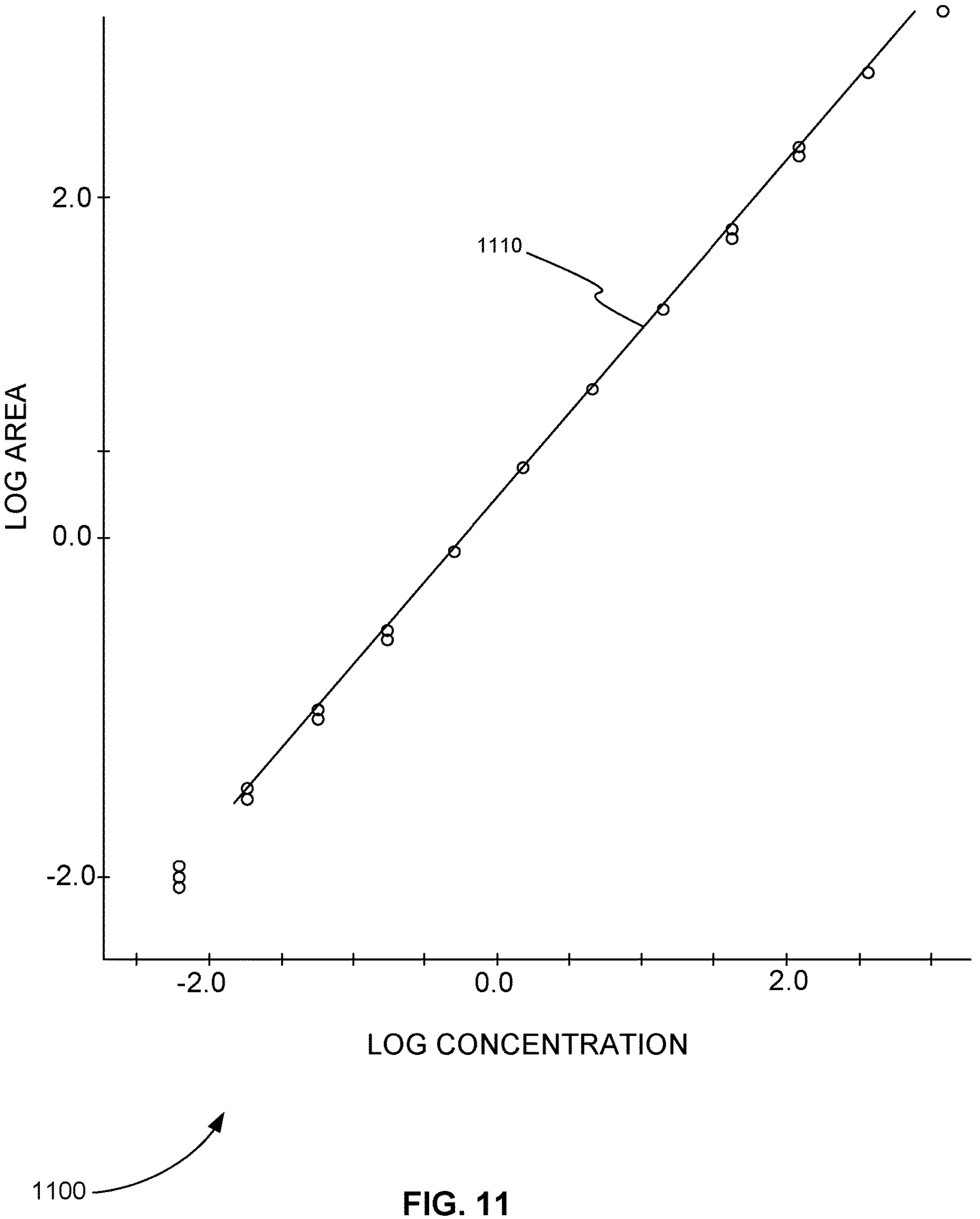
FIG. 11 is an exemplary plot of peak area versus compound concentration showing how the same quantitation data from FIG. 9 now appears as one line after being corrected using a percentage of theoretical gain calculated from a Zeno pulsing gain calibration using a known calibrant compound, in accordance with various embodiments.

FIG. 11 is an exemplary plot 1100 of peak area versus compound concentration showing how the same quantitation data from FIG. 9 now appears as one line after being corrected using a percentage of theoretical gain calculated from a Zeno pulsing gain calibration using a known calibrant compound, in accordance with various embodiments. Plot 1100 depicts a linear dynamic range quantitation curve.

The y-axis of plot 1100 represents the peak area and the x-axis represents different concentrations of the same compound. As in FIG. 9, concentration measurements spanning 4 to 5 orders of magnitude are depicted for the compound aprazolam.

Plot 1100 shows the measurements made using on-demand Zeno pulsing. Peak areas for the lower concentrations of alprazolam were found using Zeno pulsing. Peak areas for the higher concentrations of aprazolam were found using normal pulsing. The peak areas for the lower concentrations were scaled down using the theoretical gain and the percentage of theoretical gain calculated from a Zeno pulsing gain calibration using a known calibrant compound. Line 1110 is drawn through the peak areas found for both lower and higher concentrations of aprazolam using on-demand Zeno pulsing. In comparison with FIG. 9, now only one line is used to represent the linear dynamic range quantitation curve. This one line shows that it is now possible to scale the data accurately for quantitation using both the theoretical gain and the percentage of theoretical gain calculated from a Zeno pulsing gain calibration using a known calibrant compound.

System for Calibrating the Gain of Zeno Mode

Returning to FIG. 10, a system for calibrating the gain of Zeno pulsing mode includes ion guide 1023, TOF mass analyzer 1024, and processor 1040. The system calibrates the gain of ion guide 1023 and TOF mass analyzer 1024 in concentrating (Zeno mode) product ions with different m/z values before injection into TOF mass analyzer 1024 in comparison to not concentrating (normal mode) the product ions.

Processor 1040 can be, but is not limited to, a computer, a microprocessor, the computer system of FIG. 1, or any device capable of sending and receiving control signals and data to and from tandem mass spectrometer 1020 and processing data. The processor is in communication with, at least, ion guide 1023 and TOF mass analyzer 1024.

More specifically, ion guide 1023 and TOF mass analyzer 1024 of tandem mass spectrometer 1020 can be operated to dynamically concentrate or not concentrate product ions with different m/z values. Zeno pulsing mode concentrates product ions with difference m/z values while normal pulsing mode does not.

Ion source device 1010 continuously receives and ionizes a sample containing known compound 1001, producing an ion beam. As described above, ions from ion source 1010 may be passed into an ion manipulation region, where ions can be subjected to ion beam focusing, ion selection, ion ejection, ion fragmentation, ion trapping, or any other generally known forms of ion analysis, ion chemistry reaction, ion trapping or ion transmission. Ions so manipulated can exit the manipulation region and pass into ion guide 1023.

Ion guide 1023 defines a guide axis and receives product ions fragmented from a known precursor ion of known compound 1001 selected from the ion beam. The known precursor ion is selected and fragmented, for example, in mass filter 1021 and fragmentation device 1022, respectively.

TOF mass analyzer 1024 is located adjacent to ion guide 1023. TOF mass analyzer 1024 receives product ions ejected from ion guide 1024 into an extraction region of TOF mass analyzer 1024. Ion guide 1023 is adapted to provide an ion control field comprising a component for restraining movement of the product ions normal to the guide axis and comprising a component for controlling the movement of the product ions parallel to the guide axis. The ion control field has a controllable potential profile along the guide axis of ion guide 1023.

The profile is alternately switchable to a continuous mode (normal pulsing mode) where there is a continuous ejection of product ions from ion guide 1023 to TOF mass analyzer 1024 irrespective of the m/z values of the product ions or to a sequential mode (Zeno pulsing mode) where there is a sequential ejection of the product ions from ion guide 1023 to TOF mass analyzer 1024 according to the mass-to-charge ratios of the ions.

For the sequential mode, the same ion energy is applied to the product ions over their travel through ion guide 1023 to the extraction region irrespective of m/z value of the product ions. The product ions are sequentially released with the same ion energy from ion guide 1023 to provide for arrival of product ions of substantially all released m/z values within the extraction region at substantially the same time.

Processor 1040 instructs the ion guide 1023 to eject the product ions of the known precursor ion using the sequential mode and instructs TOF mass analyzer 1024 to measure the intensities of the product ions at a first group of time steps of two or more time steps 1033, producing sequential group of mass spectra 1031. Processor 1040 instructs ion guide 1023 to switch to the continuous mode and instructs TOF mass analyzer 1024 to measure the intensities of the product ions at a second group of time steps of two or more time steps 1033, producing continuous group of mass spectra 1032.

Processor 1040 calculates a gain for the sequential mode in comparison to the continuous mode as a series of ratios of intensities of one or more product ions of the product ions obtained from combination 1041 of sequential group of mass spectra 1031 to corresponding intensities of the one or more product ions obtained from combination 1042 of continuous group of mass spectra 1032.

In various embodiments, known compound 1001 is a known calibrant and the gain calibration is performed in a separate calibration experiment. In various alternative embodiments, known compound 1001 is a known analyte and the gain calibration is performed as part of an experiment analyzing the known analyte.

In various embodiments, the time steps of the first group of time steps are interleaved between time steps of the second groups of time steps in the two or more time steps 1033.

In various embodiments, combination 1041 of sequential group of mass spectra 1031 is a spectrum calculated from one of a mean, median, or mode of sequential group of mass spectra 1031. Also, combination 1042 of continuous group of mass spectra 1032 is a spectrum calculated from one of a mean, median, or mode of continuous group of mass spectra 1032.

In various embodiments, processor 1040 further calculates a gain function, $Gain_{actual}(m/z)$, from the series of ratios and corresponding m/z values of the one or more product ions that describes how the gain varies with m/z.

In various embodiments, processor 1040 further calculates a single value for the gain that is a combination of the series of ratios. For example, the combination of the series of ratios is one of a mean, median, or mode of the series of ratios.

In various embodiments, processor 1040 further calculates a theoretical gain, Gain(m/z), for the known compound. For example, the theoretical gain is calculated according to $$\text{Gain} = C\sqrt{\frac{(m/z)_{max}}{(m/z)}},$$

where C is a geometrical factor, (m/z)max is the largest value of m/z recorded in spectra.

In various embodiments, processor 1040 further calculates a percentage of the theoretical gain represented by the gain. For example, the percentage of the theoretical gain is calculated according to: $(\text{Gain}_{actual}(m/z)/\text{Gain}(m/z))\times 100\%$.

In various embodiments, processor 1040 further stores the percentage of the theoretical gain in a memory (not shown) for tandem mass spectrometer 1020 so that the percentage of the theoretical gain can be retrieved from the memory and used to correct the theoretical gain for compounds analyzed in subsequent experiments. More specifically, for example, the percentage of the theoretical gain is retrieved from the memory and is used with a calculated theoretical gain in a quantitation experiment to scale intensities measured using Zeno pulsing mode and using normal pulsing mode and produce a quantitative measurement for the experiment where the Zeno pulsing mode and the normal pulsing mode are applied on-demand.

Method for Calibrating the Gain of Zeno Mode

Figure 12:
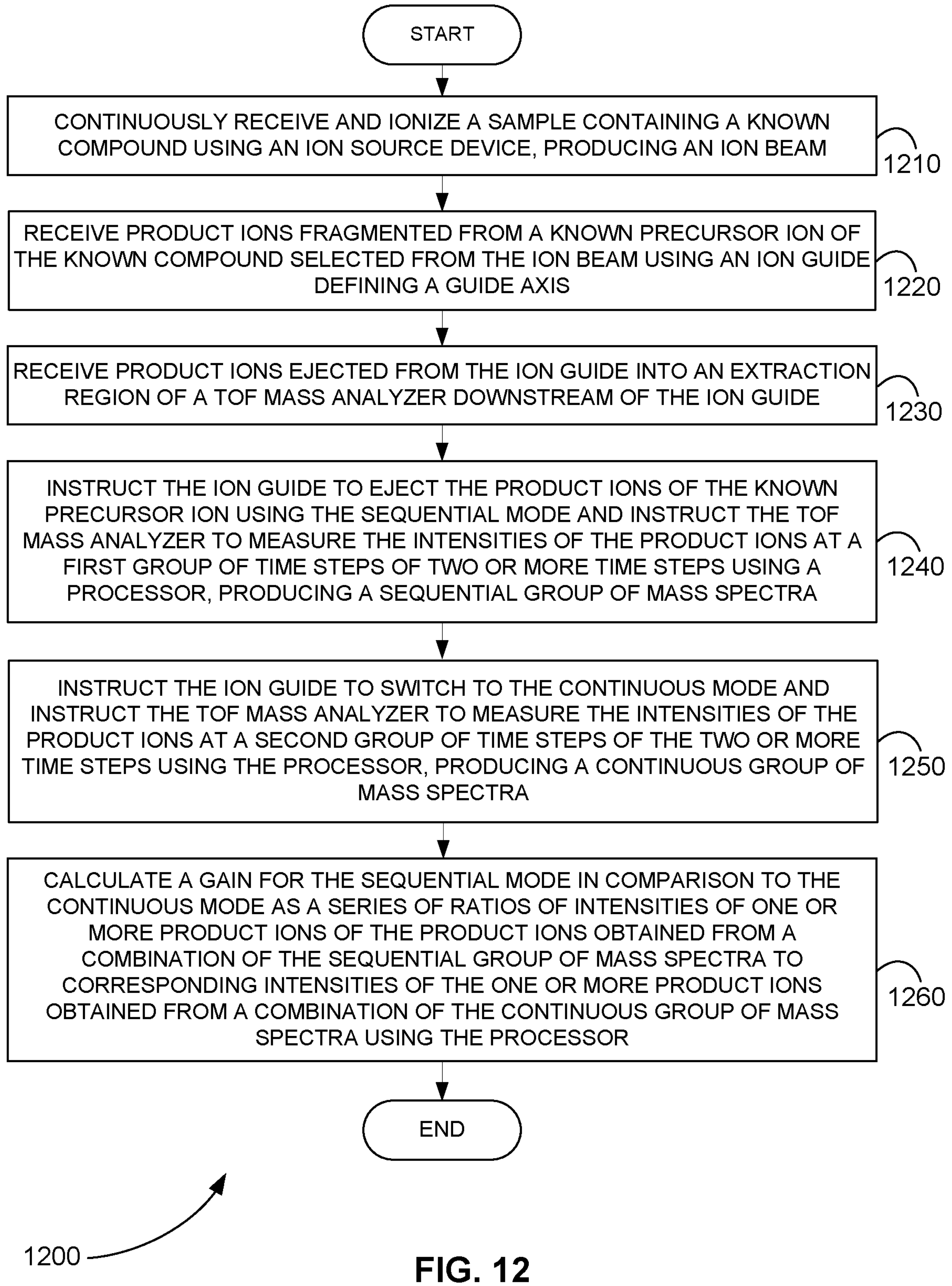
FIG. 12 is a flowchart showing a method for calibrating the gain of an ion guide and TOF mass analyzer in concentrating (Zeno pulsing mode) product ions with different m/z values before injection into the TOF mass analyzer in comparison to not concentrating (normal pulsing mode) the product ions, in accordance with various embodiments.

FIG. 12 is a flowchart 1200 showing a method for calibrating the gain of Zeno pulsing mode. More specifically, FIG. 12 is a flowchart 1200 showing a method for calibrating the gain of an ion guide and TOF mass analyzer in concentrating (Zeno pulsing mode) product ions with different m/z values before injection into the TOF mass analyzer in comparison to not concentrating (normal pulsing mode) the product ions, in accordance with various embodiments.

In step 1210 of method 1200, a sample containing a known compound is continuously received and ionized using an ion source device, producing an ion beam.

In step 1220, product ions fragmented from a known precursor ion of the known compound selected from the ion beam are received using an ion guide defining a guide axis.

In step 1230, product ions ejected from the ion guide are received into an extraction region of a TOF mass analyzer downstream of the ion guide. The ion guide is adapted to provide an ion control field comprising a component for restraining movement of the product ions normal to the guide axis and comprising a component for controlling the movement of the product ions parallel to the guide axis. The ion control field has a controllable potential profile along the guide axis of the ion guide. The profile is alternately switchable to a continuous mode where there is a continuous ejection of product ions from the ion guide to the TOF mass analyzer irrespective of the m/z values of the product ions or to a sequential mode where there is a sequential ejection of the product ions from the ion guide to the TOF mass analyzer according to the m/z values of the product ions. For the sequential mode, the same ion energy is applied to the product ions over their travel through the ion guide to the extraction region irrespective of m/z value of the product ions. The product ions are sequentially released with the same ion energy from the ion guide to provide for arrival of product ions of substantially all released m/z values within the extraction region at substantially the same time.

In step 1240, the ion guide is instructed to eject the product ions of the known precursor ion using the sequential mode and the TOF mass analyzer is instructed to measure the intensities of the product ions at a first group of time steps of two or more time steps using a processor, producing a sequential group of mass spectra.

In step 1250, the ion guide is instructed to switch to the continuous mode and the TOF mass analyzer is instructed to measure the intensities of the product ions at a second group of time steps of the two or more time steps using the processor, producing a continuous group of mass spectra.

In step 1260, a gain is calculated for the sequential mode in comparison to the continuous mode as a series of ratios of intensities of one or more product ions of the product ions obtained from a combination of the sequential group of mass spectra to corresponding intensities of the one or more product ions obtained from a combination of the continuous group of mass spectra using the processor.

Computer Program Product for Calibrating the Gain of Zeno Mode

In various embodiments, a computer program product includes a non-transitory tangible computer-readable storage medium whose contents include a program with instructions being executed on a processor so as to perform a method for calibrating the gain of Zeno pulsing mode. This method is performed by a system that includes one or more distinct software modules.

Figure 13:
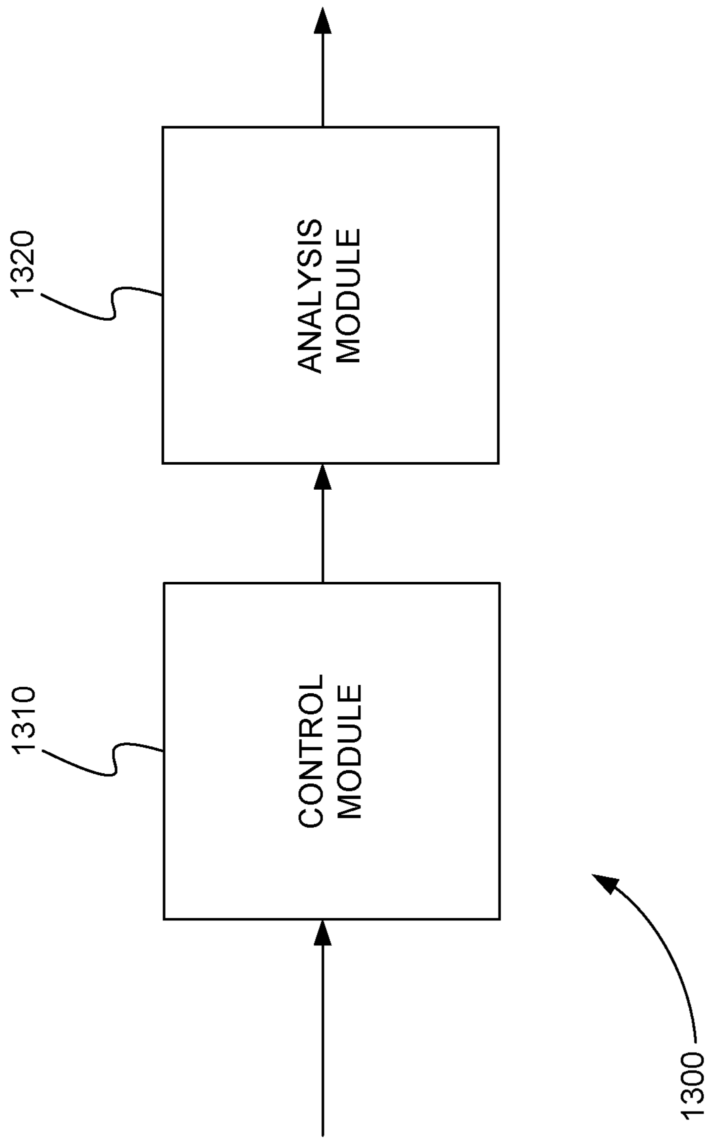
FIG. 13 is a schematic diagram of a system that includes one or more distinct software modules that performs a method for calibrating the gain of an ion guide and TOF mass analyzer in concentrating (Zeno pulsing mode) product ions with different m/z values before injection into the TOF mass analyzer in comparison to not concentrating (normal pulsing mode) the product ions, in accordance with various embodiments.

More specifically, FIG. 13 is a schematic diagram of a system 1300 that includes one or more distinct software modules that performs a method for calibrating the gain of an ion guide and TOF mass analyzer in concentrating (Zeno pulsing mode) product ions with different m/z values before injection into the TOF mass analyzer in comparison to not concentrating (normal pulsing mode) the product ions, in accordance with various embodiments. System 1300 includes control module 1310 and analysis module 1320.

Control module 1310 instructs an ion guide defining a guide axis to receive product ions fragmented from a known precursor ion of a known compound selected from an ion beam in a targeted acquisition method. An ion source device continuously receives and ionizes a sample containing the known compound, producing the ion beam.

Control module 1310 instructs a TOF mass analyzer downstream of the ion guide to receive product ions ejected from the ion guide into an extraction region of the TOF mass analyzer. The ion guide is adapted to provide an ion control field comprising a component for restraining movement of the product ions normal to the guide axis and comprising a component for controlling the movement of the product ions parallel to the guide axis.

The ion control field is dynamically switchable between normal and Zeno pulsing modes. The ion control field has a controllable potential profile along the guide axis of the ion guide. The profile is alternately switchable to a continuous mode where there is a continuous ejection of product ions from the ion guide to the TOF mass analyzer irrespective of the m/z values of the product ions or to a sequential mode where there is a sequential ejection of the product ions from the ion guide to the TOF mass analyzer according to the m/z values of the product ions. The continuous mode is the normal pulsing mode and the sequential mode is the Zeno pulsing mode. For the sequential mode, the same ion energy is applied to the product ions over their travel through the ion guide to the extraction region irrespective of m/z value of the product ions. The product ions are sequentially released with the same ion energy from the ion guide to provide for arrival of product ions of substantially all released m/z values within the extraction region at substantially the same time.

Control module 1310 instructs the ion guide to eject the product ions of the known precursor ion using the sequential mode and instructs the TOF mass analyzer to measure the intensities of the product ions at a first group of time steps of two or more time steps, producing a sequential group of mass spectra. Control module 1310 instructs the ion guide to switch to the continuous mode and instructs the TOF mass analyzer to measure the intensities of the product ions at a second group of time steps of the two or more time steps, producing a continuous group of mass spectra.

Analysis module 1320 calculates a gain for the sequential mode in comparison to the continuous mode as a series of ratios of intensities of one or more product ions of the product ions obtained from a combination of the sequential group of mass spectra to corresponding intensities of the one or more product ions obtained from a combination of the continuous group of mass spectra.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for calibrating the gain of an ion guide and a time-of-flight (TOF) mass analyzer of a tandem mass spectrometer in concentrating product ions with different mass-to-charge ratio (m/z) values before injection into the TOF mass analyzer in comparison to not concentrating the product ions, comprising:

an ion source device that continuously receives and ionizes a sample containing a known compound, producing an ion beam;

an ion guide defining a guide axis that receives product ions fragmented from a known precursor ion of the known compound selected from the ion beam;

a TOF mass analyzer downstream of the ion guide that receives the product ions ejected from the ion guide into an extraction region of the TOF mass analyzer, wherein the ion guide is adapted to provide an ion control field comprising a component for restraining movement of the product ions normal to the guide axis and comprising a component for controlling the movement of the product ions parallel to the guide axis, wherein the ion control field has a controllable potential profile along the guide axis of the ion guide, the profile being alternately switchable to a continuous mode where there is a continuous ejection of product ions from the ion guide to the TOF mass analyzer irrespective of the m/z values of the product ions or to a sequential mode where there is a sequential ejection of the product ions from the ion guide to the TOF mass analyzer according to the m/z values of the product ions, and wherein for the sequential mode the same ion energy is applied to the product ions over their travel through the ion guide to the extraction region irrespective of m/z value of the product ions and the product ions are sequentially released with the same ion energy from the ion guide to provide for arrival of product ions of substantially all released m/z values within the extraction region at substantially the same time; and a processor in communication with the ion guide and the TOF mass analyzer that instructs the ion guide to eject the product ions of the known precursor ion using the sequential mode and instructs the TOF mass analyzer to measure the intensities of the product ions at a first group of time steps of two or more time steps, producing a sequential group of mass spectra, instructs the ion guide to switch to the continuous mode and instructs the TOF mass analyzer to measure the intensities of the product ions at a second group of time steps of the two or more time steps, producing a continuous group of mass spectra, and calculates a gain for the sequential mode in comparison to the continuous mode as a series of ratios of intensities of one or more product ions of the product ions obtained from a combination of the sequential group of mass spectra to corresponding intensities of the one or more product ions obtained from a combination of the continuous group of mass spectra, wherein the processor further calculates a gain function, $\text{Gain}_{actual}(m/z)$, from the series of ratios and corresponding m/z values of the one or more product ions that describes how the gain varies with m/z.

2. The system of claim 1, wherein the known compound comprises a known calibrant and the gain calibration is performed in a separate calibration experiment.

3. The system of claim 1, wherein the known compound comprises a known analyte and the gain calibration is performed as part of an experiment analyzing the known analyte.

4. The system of claim 1, wherein time steps of the first group of time steps are interleaved between time steps of the second groups of time steps in the two or more time steps.

5. The system of claim 1, wherein the combination of the sequential group of mass spectra comprises a spectrum calculated from one of a mean, median, or mode of the sequential group of mass spectra and the combination of the continuous group of mass spectra comprises a spectrum calculated from one of a mean, median, or mode of the continuous group of mass spectra.

6. The system of claim 1, wherein the processor further calculates a single value for the gain that is a combination of the series of ratios.

7. The system of claim 6, wherein the combination of the series of ratios comprises one of a mean, median, or mode of the series of ratios.

8. The system of claim 1, wherein the processor further calculates a theoretical gain, Gain(m/z), for the known compound.

9. The system of claim 8, wherein the theoretical gain is calculated according to $$\text{Gain} = C\sqrt{\frac{(m/z)_{max}}{(m/z)}},$$

where C is a geometrical factor, (m/z) max is the largest value of m/z recorded in spectra.

10. The system of claim 8, wherein the processor further calculates a percentage of the theoretical gain represented by the gain.

11. The system of claim 10, wherein the percentage of the theoretical gain comprises $(Gain_{actual}(m/z)/Gain(m/z))\times 100\%$.

12. The system of claim 11, wherein the processor further stores the percentage of the theoretical gain in a memory for the tandem mass spectrometer so that the percentage of the theoretical gain is retrieved from the memory and is used with a calculated theoretical gain in a quantitation experiment to scale intensities measured using a continuous mode and using a sequential mode and produce a quantitative measurement for the experiment where the continuous mode and the sequential mode are applied on-demand.

13. A method for calibrating the gain of an ion guide and a time-of-flight (TOF) mass analyzer of a tandem mass spectrometer in concentrating product ions with different mass-to-charge ratio (m/z) values before injection into the TOF mass analyzer in comparison to not concentrating the product ions, comprising:

continuously receiving and ionizing a sample containing a known compound using an ion source device, producing an ion beam;

receiving product ions fragmented from a known precursor ion of the known compound selected from the ion beam using an ion guide defining a guide axis;

receiving product ions ejected from the ion guide into an extraction region of a TOF mass analyzer downstream of the ion guide, wherein the ion guide is adapted to provide an ion control field comprising a component for restraining movement of the product ions normal to the guide axis and comprising a component for controlling the movement of the product ions parallel to the guide axis, wherein the ion control field has a controllable potential profile along the guide axis of the ion guide, the profile being alternately switchable to a continuous mode where there is a continuous ejection of product ions from the ion guide to the TOF mass analyzer irrespective of the m/z values of the product ions or to a sequential mode where there is a sequential ejection of the product ions from the ion guide to the TOF mass analyzer according to the m/z values of the product ions, and wherein for the sequential mode the same ion energy is applied to the product ions over their travel through the ion guide to the extraction region irrespective of m/z value of the product ions and the product ions are sequentially released with the same ion energy from the ion guide to provide for arrival of product ions of substantially all released m/z values within the extraction region at substantially the same time;

instructing the ion guide to eject the product ions of the known precursor ion using the sequential mode and instructing the TOF mass analyzer to measure the intensities of the product ions at a first group of time steps of two or more time steps using a processor, producing a sequential group of mass spectra;

instructing the ion guide to switch to the continuous mode and instructing the TOF mass analyzer to measure the intensities of the product ions at a second group of time steps of the two or more time steps using the processor, producing a continuous group of mass spectra; and calculating a gain for the sequential mode in comparison to the continuous mode as a series of ratios of intensities of one or more product ions of the product ions obtained from a combination of the sequential group of mass spectra to corresponding intensities of the one or more product ions obtained from a combination of the continuous group of mass spectra using the processor, wherein the processor further calculates a gain function, $Gain_{actual}(m/z)$, from the series of ratios and corresponding m/z values of the one or more product ions that describes how the gain varies with m/z.

14. A computer program product, comprising a non-transitory tangible computer-readable storage medium whose contents include a program with instructions being executed on a processor so as to perform a method for calibrating the gain of an ion guide and a time-of-flight (TOF) mass analyzer of a tandem mass spectrometer in concentrating product ions with different mass-to-charge ratio (m/z) values before injection into the TOF mass analyzer in comparison to not concentrating the product ions, comprising:

providing a system, wherein the system comprises one or more distinct software modules, and wherein the distinct software modules comprise a control module and an analysis module;

instructing an ion guide defining a guide axis to receive product ions fragmented from a known precursor ion of a known compound selected from an ion beam using the control module, wherein an ion source device continuously receives and ionizes a sample containing the known compound, producing the ion beam;

instructing a TOF mass analyzer downstream of the ion guide to receive product ions ejected from the ion guide into an extraction region of the TOF mass analyzer using the control module, wherein the ion guide is adapted to provide an ion control field comprising a component for restraining movement of the product ions normal to the guide axis and comprising a component for controlling the movement of the product ions parallel to the guide axis, wherein the ion control field has a controllable potential profile along the guide axis of the ion guide, the profile being alternately switchable to a continuous mode where there is a continuous ejection of product ions from the ion guide to the TOF mass analyzer irrespective of the m/z values of the product ions or to a sequential mode where there is a sequential ejection of the product ions from the ion guide to the TOF mass analyzer according to the m/z values of the product ions, and wherein for the sequential mode the same ion energy is applied to the product ions over their travel through the ion guide to the extraction region irrespective of m/z value of the product ions and the product ions are sequentially released with the same ion energy from the ion guide to provide for arrival of product ions of substantially all released m/z values within the extraction region at substantially the same time;

instructing the ion guide to eject the product ions of the known precursor ion using the sequential mode and instructing the TOF mass analyzer to measure the intensities of the product ions at a first group of time steps of two or more time steps using a control module, producing a sequential group of mass spectra;

instructing the ion guide to switch to the continuous mode and instructing the TOF mass analyzer to measure the intensities of the product ions at a second group of time steps of the two or more time steps using the control module, producing a continuous group of mass spectra; and calculating a gain for the sequential mode in comparison to the continuous mode as a series of ratios of intensities of one or more product ions of the product ions obtained from a combination of the sequential group of mass spectra to corresponding intensities of the one or more product ions obtained from a combination of the continuous group of mass spectra using the analysis module, wherein the processor further calculates a gain function, $Gain_{actual}(m/z)$, from the series of ratios and corresponding m/z values of the one or more product ions that describes how the gain varies with m/z.

* * * * *